US012563605B2

(12) United States Patent     (10) Patent No.: US 12,563,605 B2

Liu et al.     (45) Date of Patent: Feb. 24, 2026

(54) SYSTEM AND METHOD FOR NETWORK ACCESS

(71) Applicant: Futurewei Technologies, Inc., Addison, TX (US)

(72) Inventors: Jialing Liu, Palatine, IL (US); Qian Cheng, Naperville, IL (US); Weimin Xiao, Hoffman Estates, IL (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 0 days.

(21) Appl. No.: 18/593,634

(22) Filed: Mar. 1, 2024

(65) Prior Publication Data

US 2024/0205982 A1     Jun. 20, 2024

Related U.S. Application Data

(60) Continuation of application No. 17/947,510, filed on Sep. 19, 2022, now Pat. No. 11,924,885, which is a (Continued)

(51) Int. Cl.
| | |
|---|---|
| *H04J 11/00* | (2006.01) |
| *H04W 24/10* | (2009.01) |

(Continued)

(52) U.S. Cl.
CPC ..... *H04W 74/0833* (2013.01); *H04J 11/0069* (2013.01); *H04J 11/0076* (2013.01);

(Continued)

(58) Field of Classification Search
CPC ........ H04B 7/02–12; H04B 7/24–2696; H04B 17/0082–3913; H04J 11/0023–0093;

(Continued)

(56) References Cited

U.S. PATENT DOCUMENTS

| | | |
|---|---|---|
| 2006/0293060 A1 | 12/2006 | Yang et al. |
| 2010/0184434 A1 | 7/2010 | Jeong et al. |

(Continued)

FOREIGN PATENT DOCUMENTS

EP     1641299 A1 *    3/2006    ............ H04W 48/10

OTHER PUBLICATIONS

3GPP Ts 36.212 V8.0.0 (Sep. 2007); 3rd Generation Partnership Project; Technical Specification Group Radio Access Network; Evolved Universal Terrestrial Radio Access (E-UTRA); Multiplexing and channel coding (Release 8); 30 pages.

(Continued)

*Primary Examiner* — Timothy J Weidner
(74) *Attorney, Agent, or Firm* — Slater Matsil, LLP

(57) ABSTRACT

A method includes a user equipment (UE) receiving, from a first transmission reception point (TRP) on a first carrier, a synchronization signal (SS) and at least a physical broadcast channel (PBCH). The UE performs a random access channel (RACH) procedure with a second TRP on a second carrier in accordance with configuration information from at least the PBCH. The UE on the second carrier establishes a radio resource control (RRC) connection with the second TRP.

17 Claims, 14 Drawing Sheets

Related U.S. Application Data division of application No. 15/648,340, filed on Jul. 12, 2017, now Pat. No. 11,452,136.

(60) Provisional application No. 62/374,398, filed on Aug. 12, 2016.

(51) Int. Cl.

| | |
|---|---|
| *H04W 48/10* | (2009.01) |
| *H04W 48/16* | (2009.01) |
| *H04W 48/18* | (2009.01) |
| *H04W 48/20* | (2009.01) |
| *H04W 52/24* | (2009.01) |
| *H04W 52/40* | (2009.01) |
| *H04W 52/50* | (2009.01) |
| *H04W 56/00* | (2009.01) |
| *H04W 74/00* | (2009.01) |
| *H04W 74/08* | (2024.01) |
| *H04W 74/0833* | (2024.01) |
| *H04W 76/11* | (2018.01) |
| *H04W 76/27* | (2018.01) |
| *H04W 84/02* | (2009.01) |
| *H04W 88/02* | (2009.01) |
| *H04W 88/08* | (2009.01) |
| *H04W 92/02* | (2009.01) |
| *H04W 92/10* | (2009.01) |

(52) U.S. Cl.
CPC .......... *H04W 24/10* (2013.01); *H04W 48/10* (2013.01); *H04W 48/16* (2013.01); *H04W 48/18* (2013.01); *H04W 48/20* (2013.01); *H04W 52/242* (2013.01); *H04W 52/246* (2013.01); *H04W 52/40* (2013.01); *H04W 52/50* (2013.01); *H04W 56/0015* (2013.01); *H04W 74/002* (2013.01); *H04W 74/004* (2013.01); *H04W 74/006* (2013.01); *H04W 74/0866* (2013.01); *H04W 76/11* (2018.02); *H04W 76/27* (2018.02); *H04J 2011/0096* (2013.01); *H04J 2211/005* (2013.01); *H04W 84/02* (2013.01); *H04W 88/02* (2013.01); *H04W 88/08* (2013.01); *H04W 92/02* (2013.01); *H04W 92/10* (2013.01)

(58) Field of Classification Search
CPC . H04J 2011/0003–0096; H04J 2211/001–008; H04L 5/0001–0098; H04W 24/02–10; H04W 36/0005–385; H04W 48/02–20; H04W 52/02–60; H04W 56/0005–0095; H04W 72/02–569; H04W 74/002–0891; H04W 76/10–50; H04W 84/02–16; H04W 88/02–12; H04W 92/02–04; H04W 92/10
See application file for complete search history.

(56) References Cited

U.S. PATENT DOCUMENTS

| | | | |
|---|---|---|---|
| 2011/0194501 A1* | 8/2011 | Chung ................. | H04L 5/0053 |
| 2013/0029657 A1 | 1/2013 | Gao et al. | |
| 2015/0280881 A1 | 10/2015 | Gao et al. | |
| 2015/0327218 A1* | 11/2015 | Kim ..................... | H04W 72/23 |
| 2016/0095008 A1 | 3/2016 | Zhao et al. | |
| 2016/0192376 A1 | 6/2016 | Lee et al. | |
| 2017/0048047 A1 | 2/2017 | Kadous et al. | |
| 2017/0094547 A1 | 3/2017 | Yum et al. | |
| 2017/0105136 A1 | 4/2017 | Reider et al. | |
| 2019/0103931 A1 | 4/2019 | Yi et al. | |
| 2019/0387479 A1 | 12/2019 | Gong et al. | |
| 2020/0068497 A1 | 2/2020 | Gong et al. | |
| 2020/0305122 A1 | 9/2020 | Harada et al. | |

OTHER PUBLICATIONS

3GPP TS 36.213 V8.2.0 (Mar. 2008); 3rd Generation Partnership Project; Technical Specification Group Radio Access Network; Evolved Universal Terrestrial Radio Access (E-UTRA); Physical layer procedures (Release 8); 30 pages.

3GPP TS 36.304 V8.2.0 (May 2008); 3rd Generation Partnership Project; Technical Specification Group Radio Access Network; Evolved Universal Terrestrial Radio Access (E-UTRA); User Equipment (UE) procedures in idle mode (Release 8); 27 pages.

3GPP TS 36.321 V8.0.0 (Dec. 2007); 3rd Generation Partnership Project; Technical Specification Group Radio Access Network; Evolved Universal Terrestrial Radio Access (E-UTRA) Medium Access Control (MAC) protocol specification (Release 8); 23 pages.

ETSI TS 136 133 V8.9.0 (Apr. 2010); LTE; Evolved Universal Terrestrial Radio Access (E-UTRA); Requirements for support of radio resource management (3GPP TS 36.133 version 8.9.0 Release 8); 330 pages.

ETSI TS 136 211 V8.7.0 (Jun. 2009); LTE; Evolved Universal Terrestrial Radio Access (E-UTRA); Physical channels and modulation (3GPP TS 36.211 version 8.7.0 Release 8); 87 pages.

ETSI TS 136 214 V8.7.0 (Oct. 2009); LTE; Evolved Universal Terrestrial Radio Access (E-UTRA); Physical layer—Measurements (3GPP TS 36.214 version 8.7.0 Release 8); 14 pages.

ETSI TS 136 300 V8.10.0 (Sep. 2009); LTE; Evolved Universal Terrestrial Radio Access (E-UTRA) and Evolved Universal Terrestrial Radio Access Network (E-UTRAN); Overall description; Stage 2 (3GPP TS 36.300 version 8.10.0 Release 8); 151 pages.

ETSI TS 136 331 V8.6.0 (Sep. 2009); LTE; Evolved Universal Terrestrial Radio Access (E-UTRA); Radio Resource Control (RRC); Protocol specification (3GPP TS 36.331 version 8.6.0 Release 8); 211 pages.

* cited by examiner

230

890

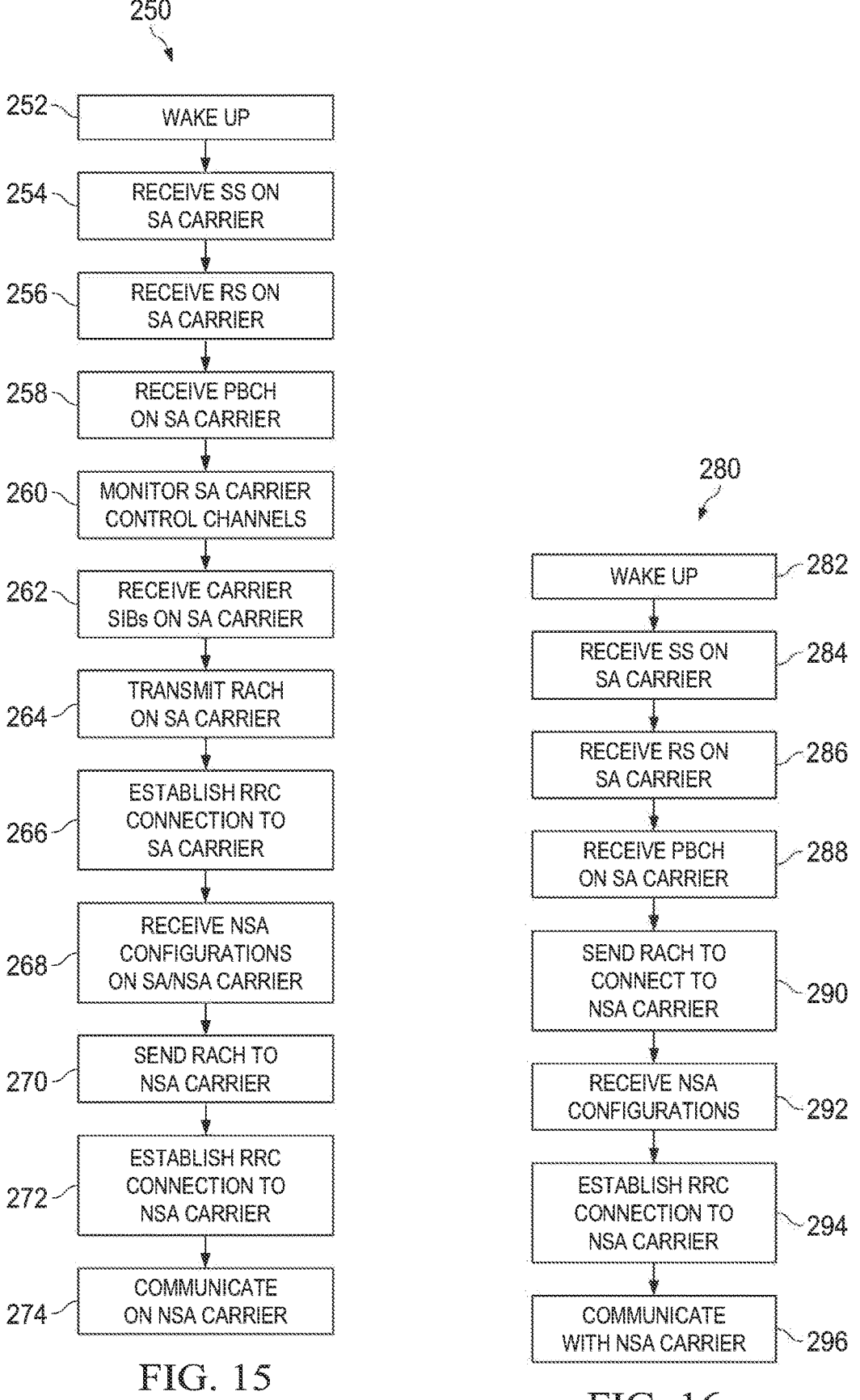

250

252 — WAKE UP

254 — RECEIVE SS ON SA CARRIER

256 — RECEIVE RS ON SA CARRIER

258 — RECEIVE PBCH ON SA CARRIER

260 — MONITOR SA CARRIER CONTROL CHANNELS

262 — RECEIVE CARRIER SIBs ON SA CARRIER

264 — TRANSMIT RACH ON SA CARRIER

266 — ESTABLISH RRC CONNECTION TO SA CARRIER

268 — RECEIVE NSA CONFIGURATIONS ON SA/NSA CARRIER

270 — SEND RACH TO NSA CARRIER

272 — ESTABLISH RRC CONNECTION TO NSA CARRIER

274 — COMMUNICATE ON NSA CARRIER

WAKE UP — 282

RECEIVE SS ON SA CARRIER — 284

RECEIVE RS ON SA CARRIER — 286

RECEIVE PBCH ON SA CARRIER — 288

SEND RACH TO CONNECT TO NSA CARRIER — 290

RECEIVE NSA CONFIGURATIONS — 292

ESTABLISH RRC CONNECTION TO NSA CARRIER — 294

COMMUNICATE WITH NSA CARRIER — 296

FIG. 16

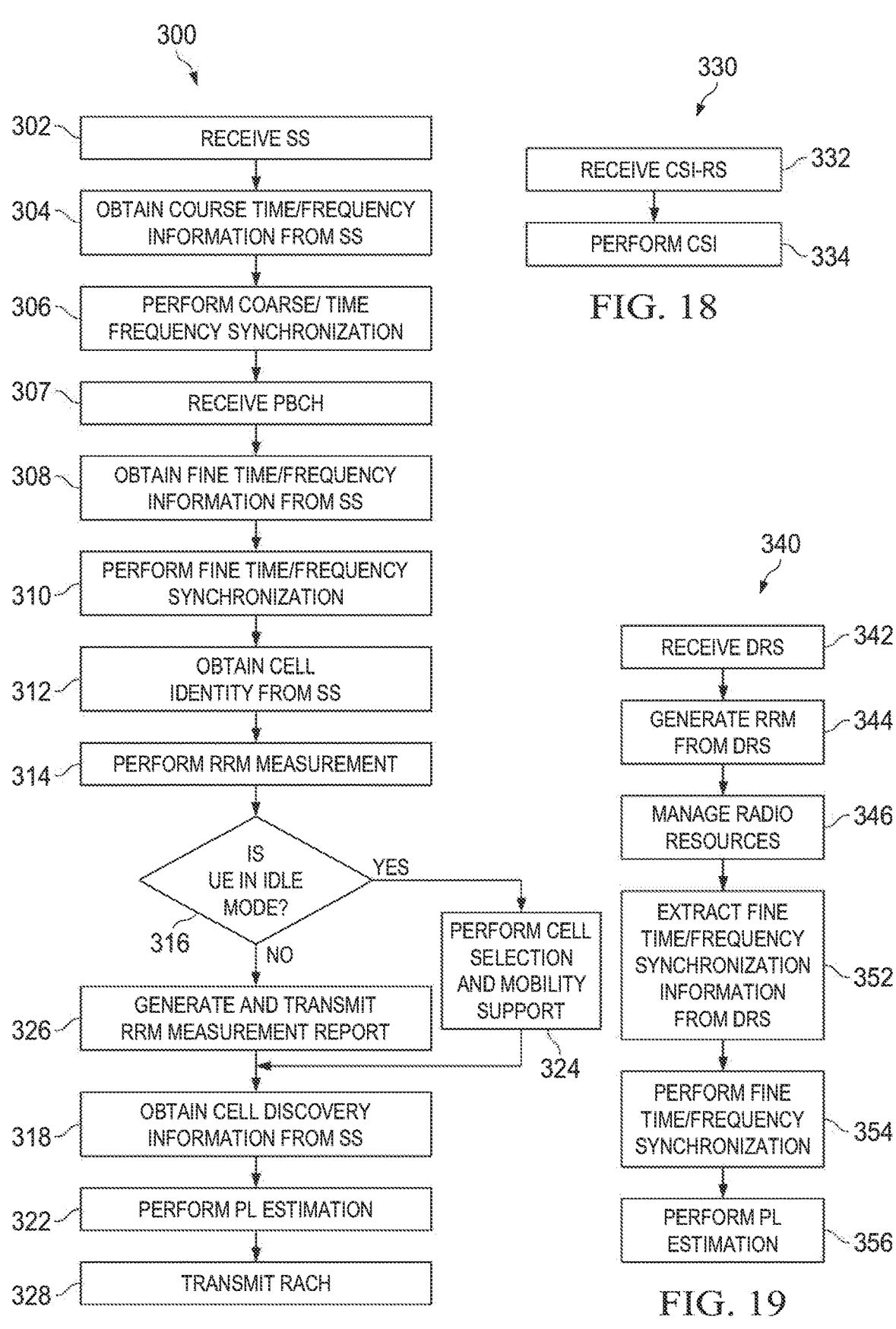

300

302 — RECEIVE SS

304 — OBTAIN COURSE TIME/FREQUENCY INFORMATION FROM SS

306 — PERFORM COARSE/ TIME FREQUENCY SYNCHRONIZATION

307 — RECEIVE PBCH

308 — OBTAIN FINE TIME/FREQUENCY INFORMATION FROM SS

310 — PERFORM FINE TIME/FREQUENCY SYNCHRONIZATION

312 — OBTAIN CELL IDENTITY FROM SS

314 — PERFORM RRM MEASUREMENT

316 — IS UE IN IDLE MODE?

YES

NO

324 — PERFORM CELL SELECTION AND MOBILITY SUPPORT

326 — GENERATE AND TRANSMIT RRM MEASUREMENT REPORT

318 — OBTAIN CELL DISCOVERY INFORMATION FROM SS

322 — PERFORM PL ESTIMATION

328 — TRANSMIT RACH

332 — RECEIVE CSI-RS

334 — PERFORM CSI

342 — RECEIVE DRS

344 — GENERATE RRM FROM DRS

346 — MANAGE RADIO RESOURCES

352 — EXTRACT FINE TIME/FREQUENCY SYNCHRONIZATION INFORMATION FROM DRS

354 — PERFORM FINE TIME/FREQUENCY SYNCHRONIZATION

356 — PERFORM PL ESTIMATION

SYSTEM AND METHOD FOR NETWORK ACCESS

CROSS-REFERENCE TO RELATED APPLICATIONS

This application is a continuation of U.S. patent application Ser. No. 17/947,510, filed on Sep. 19, 2022, now U.S. Pat. No. 11,924,885, issued on Mar. 5, 2024 and titled "System and Method for Network Access," which is a divisional of U.S. patent application Ser. No. 15/648,340, filed on Jul. 12, 2017, now U.S. Pat. No. 11,452,136, issued on Sep. 20, 2022 and titled "System and Method for Network Access," which claims the benefit of U.S. Provisional Application No. 62/374,398, filed on Aug. 12, 2016 and titled "System and Method for Wireless Access and reference signals," which applications are hereby incorporated herein by reference.

TECHNICAL FIELD

Disclosed embodiments relate generally to a system and method for wireless communications and, in particular embodiments, to a system and method for network access.

BACKGROUND

In Long Term Evolution (LTE), a common reference signal (CRS) is used for cell search and initial acquisition, downlink channel estimation for demodulation, and downlink channel quality measurements. The CRS may be transmitted on every subframe with a certain time/frequency density. In LTE, CRS transmission is always on, regardless of the presence or absence of data transmission, unless the cell is off. The always-on nature of the CRS may cause interface for neighboring cell. Thus, the CRS may lead to persistent interference. Additionally, the static nature of the CRS lacks flexibility. Also, LTE relies heavily on a physical cell identifier (PCID) in the CRS and in other signals and channels. However, the use of PCID may lead to forward compatibility issues, due to its rigidity.

SUMMARY

According to one aspect of the present disclosure, there is provided a method that includes receiving, by a user equipment (UE) from a first base station, on a first carrier, a synchronization sequence (SS) and performing a radio resource management (RRM) measurement in accordance with the SS. The method also includes performing cell selection and mobility support in accordance with the RRM measurement, when the UE is in idle mode and generating an RRM measurement report in accordance with the RRM measurement and transmitting, by the UE to the first base station on the first carrier, the RRM measurement report, when the UE is in connected mode.

Optionally, in any of the preceding aspects, another implementation of the aspect provides that the method further includes obtaining coarse time/frequency synchronization information from the SS and receiving a physical broadcast channel (PBCH) in accordance with the coarse time/frequency synchronization information.

Optionally, in any of the preceding aspects, another implementation of the aspect provides that the method further includes obtaining a cell identity of a cell of the first base station from the SS.

Optionally, in any of the preceding aspects, another implementation of the aspect provides that the method further includes performing path loss (PL) estimation in accordance with the SS.

Optionally, in any of the preceding aspects, another implementation of the aspect provides that the method further includes transmitting, by the UE, a random access channel (RACH) on a second carrier, where configuration for the RACH is obtained from the first carrier and receiving, by the UE on the second carrier, a UE identifier (UEID) for the UE transmitting, by the UE on the second carrier, a physical uplink shared channel (PUSCH) and a demodulation reference signal (DMRS) based on the UEID. The method also includes receiving, by the UE, a physical downlink control channel (PDCCH) or an enhanced PDCCH (ePDCCH), and a physical downlink scheduling channel (PDSCH) carrying radio resource control (RRC) configuration information, based on the UEID and connecting, by the UE to the second carrier, in accordance with the RRC configuration information.

Optionally, in any of the preceding aspects, the second carrier is the same as the first carrier, and power of the RACH is based on the PL estimation.

According to one aspect of the present disclosure, there is provided a method that includes receiving, by a UE from a first base station, on a first carrier, a SS and performing a RRM measurement based on the SS. The method also includes connecting the UE to a second carrier, after performing a RACH procedure in accordance with the RRM measurement and receiving, by the UE, a reference signal (RS), while the UE is connected to the second carrier, where the RS is configured for the UE. Additionally, the method includes performing, by the UE, a RRM measurement based on the RS.

Optionally, in any of the preceding aspects, where the RS is a channel state information reference signal (CSI-RS), and where the CSI-RS is associated with a virtual cell identifier (VCID) or a UEID.

Optionally, in any of the preceding aspects, another implementation of the aspect provides that the method further includes receiving, by the UE on the second carrier, a second RS and performing control demodulation, data demodulation, or digital automatic gain control (AGC) in accordance with the RS.

Optionally, in any of the preceding aspects, another implementation of the aspect provides that the method further includes performing fine time/frequency tracking in accordance with the RS.

Optionally, in any of the preceding aspects, where the RS is associated with a VCID or a UEID.

Optionally, in any of the preceding aspects, another implementation of the aspect provides that the method further includes receiving, by the UE, on the first carrier, while connected to the second carrier, a second RS, where the second RS is associated with a VCID or a UEID.

Optionally, in any of the preceding aspects, another implementation of the aspect provides that the method further includes perming PL estimation in accordance with the RS.

Optionally, in any of the preceding aspects, another implementation of the aspect provides that the method further includes broadcasting, by the UE, an uplink beacon including a VCID or a UEID.

Optionally, in any of the preceding aspects, where the second carrier is the same as the first carrier.

According to one aspect of the present disclosure, there is provided a method that includes receiving, by a UE from a first base station, on a first carrier, an SS and an RS and receiving, by the UE from the first base station, on the first carrier, a PBCH. The method also includes decoding the PBCH using the SS and the RS, to produce a decoded PBCH and decoding a minimum system information block (SIB) in accordance with the SS, the RS, and the decoded PBCH. Additionally, the method includes transmitting, by the UE, on a second carrier, an RACH in accordance with the decoded PBCH and the minimum SIB, without connecting to the first carrier.

Optionally, in any of the preceding aspects, another implementation of the aspect provides that the method further includes performing, by the UE, on the second carrier, a portion of a random access procedure to receive second carrier configuration information and establishing RRC connection to the second carrier in accordance with the second carrier configuration information.

Optionally, in any of the preceding aspects, another implementation of the aspect provides that the method further includes broadcasting, by the UE, a beacon signal, where the beacon signal includes a VCID or a UEID. The method also includes receiving, by the UE from a second base station, a connection request for a second carrier, in response to the beacon signal and connecting, by the UE, to the second carrier.

According to one aspect of the present disclosure, there is provided a base station that includes a first antenna panel including a first plurality of antenna elements and a second antenna panel including a second plurality of antenna elements. The base station also includes a non-transitory memory storage includes instructions and one or more processors in communication with the non-transitory memory storage, where the one or more processors is coupled to the first antenna panel and the second antenna panel. The one or more processors execute the instructions to perform first beamforming on the first antennal panel and transmit, by the first antenna panel to a UE a first signal on a first beam having a first index in a first direction, in accordance with the first beamforming. The one or more processors also execute instructions to perform second beamforming on the second antenna panel and transmit, by the second antenna panel to the UE, a second signal on a second beam having the first index in the first direction, in accordance with the second beamforming.

Optionally, in any of the preceding aspects, another implementation of the aspect provides that the one or more processors execute the instructions to determine a PL estimate for the UE and transmit, to the UE, the PL estimate.

The foregoing has outlined rather broadly the features of an embodiment of the this disclosure in order that the detailed description of this disclosure that follows may be better understood. Additional features and advantages of disclosed embodiments will be described hereinafter, which form the subject of the claims of this disclosure. It should be appreciated by those skilled in the art that the conception and specific embodiments disclosed may be readily utilized as a basis for modifying or designing other structures or processes for carrying out the same purposes of the disclosed embodiments. It should also be realized by those skilled in the art that such equivalent constructions do not depart from the spirit and scope of this disclosure as set forth in the appended claims.

BRIEF DESCRIPTION OF THE DRAWINGS

For a more complete understanding of this disclosure, and the advantages thereof, reference is now made to the following descriptions taken in conjunction with the accompanying drawings, in which:

FIG. 15 illustrates a flowchart of an embodiment method for network access, performed by a user equipment (UE);

FIG. 16 illustrates another flowchart of an embodiment method for network access, performed by a UE;

FIG. 17 illustrates a flowchart of an embodiment method for utilizing a synchronization sequence (SS), performed by a UE;

FIG. 18 illustrates the flowchart of an embodiment method for channel state interference (CSI) management, performed by a UE;

FIG. 19 illustrates a flowchart of an embodiment method for utilizing a discovery reference signal (DRS), performed by a UE;

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

It should be understood at the outset that although an illustrative implementation of one or more embodiments are provided below, the disclosed systems and/or methods may be implemented using any number of techniques, whether currently known or not. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
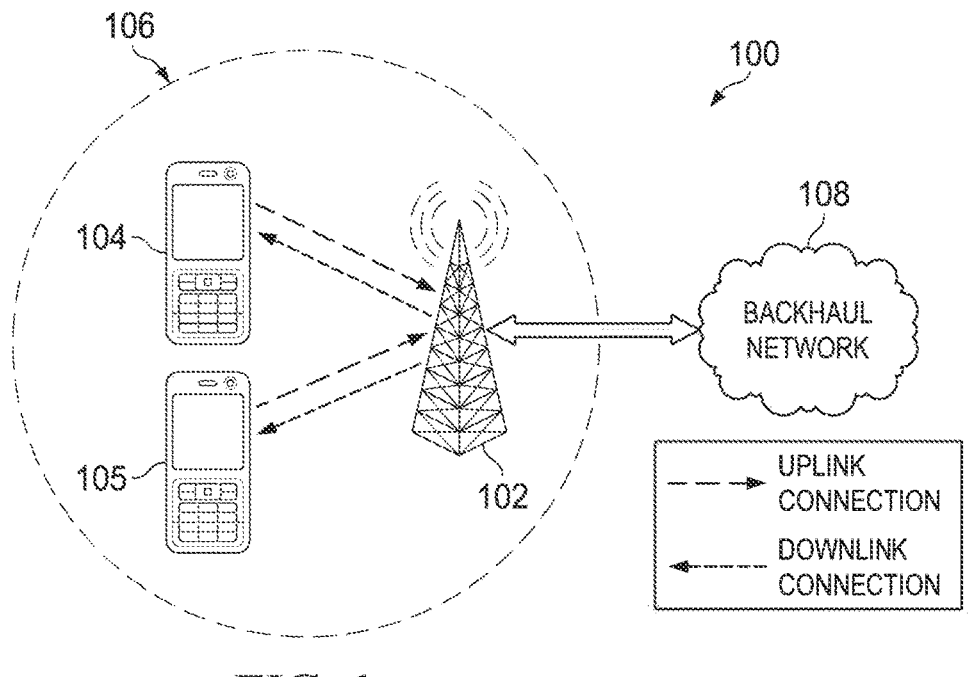
FIG. 1 illustrates a diagram of a wireless network for communicating data associated with some embodiments.

FIG. 1 illustrates a network 100 for communicating data according to some embodiments. The network 100 includes the base station 102 having a coverage area 106, a plurality of mobile devices, including the mobile device 104 and the mobile device 105, and the backhaul network 108. In this embodiment, two mobile devices are depicted, but many more may be present. The base station 102 may be any component capable of providing wireless access by establishing uplink (dashed line) and/or downlink (dotted line) connections with the mobile device 104 and the mobile device 105, which serve to carry data from the mobile devices 104 and 105 to the base station 102 and vice versa. Data carried over the uplink/downlink connections may include data communicated between the mobile device 104 and the mobile device 105, as well as data communicated to/from a remote-end (not shown) byway of the backhaul network 108. As used here, the term base station refers to any component (or collection of components) configured to provide wireless access to a network, such as a NodeB, an enhanced nodeB (eNB), new radio (NR) or fifth generation (5G) (gNB), an access point, a picocell, a femtocell, macrocell, a Wi-Fi access point (AP), a relay node, and other wirelessly enabled devices. Base stations may provide wireless access in accordance with one or more wireless communication protocols, e.g., long term evolution (LTE), LTE advanced (LTE-A), High Speed Packet Access (HSPA), NR, Wi-Fi 802.11a/b/g/n/ac, etc. The mobile device 104 and the mobile device 105 may be any component (or collection of components) capable of establishing a wireless connection with the base station 102, such as user equipments (UEs), mobile stations (STAs), cell phones, smart phones, tablets, sensors, and other wirelessly enabled devices. In some embodiments, the network 100 may include various other wireless devices, such as relays, low power nodes, etc.

Figure 2:
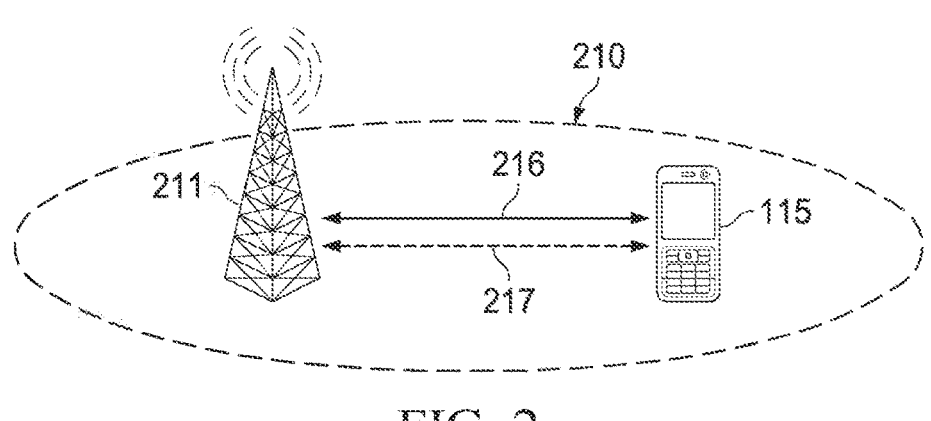
FIG. 2 illustrates an embodiment wireless network for carrier aggregation and carrier switching.

FIG. 2 illustrates a wireless network 210 for supporting carrier aggregation and/or carrier switching. As shown, the base station 211 communicates with the mobile device 115 over different component carriers 216 and 217. A carrier may also be referred to as a channel, a cell, a base station (BS), a transmit point (TP), a transmission reception point (TRP), a base station (BS), or a nodeB (NB). In some embodiments, the component carrier 216 is a primary component carrier (PCC), and the component carrier 217 is a secondary component carrier (SCC). In an embodiment, the PCC carries control information (e.g., feedback from the mobile device 115 to the base station 211), and the SCC carries data traffic. In the 3$^{rd}$ Generation Partnership Project (3GPP) Rel-10 specification, a component carrier is called a cell. When multiple cells are controlled by the same eNodeB, a single scheduler may perform cross scheduling of multiple cells. In the context of carrier aggregation, one node may operate and control several component carriers, thereby forming a primary cell (Pcell, on the PCC) and secondary cells (Scells, on the SCCs). A primary carrier that is communicated from a base station to a mobile device may be referred to as a Downlink Primary Component Carrier (DL PCC), while a primary carrier communicated from a mobile device to a base station may be referred to as an Uplink Primary Component Carrier (UL PCC). A secondary carrier that is communicated from a base station to a mobile device may be referred to as a Downlink Secondary Component Carrier (DL SCC), while a secondary carrier communicated from a mobile device to a base station may be referred to as an Uplink Secondary Component Carrier (UL SCC). In Rel-ii design, an eNodeB may control both a macrocell and a picocell. In this case, the backhaul between the macrocell and the picocell is fast backhaul. The eNodeB can control the transmission/reception of both macro cell and Pico cell dynamically. In later releases, the backhaul connections between the cells may be non-ideal backhaul, and the eNB cannot control the transmission/reception of all cells dynamically but only semi-statically. In NR, the concept of bandwidth parts (BWPs) are introduced within a CC, but a BWP operates similarly to a LTE CC and the BWPs within a CC operate similarly to LTE intra-band contiguous CA. A CC and BWP may be viewed as equivalent unless otherwise specified.

Figure 3:
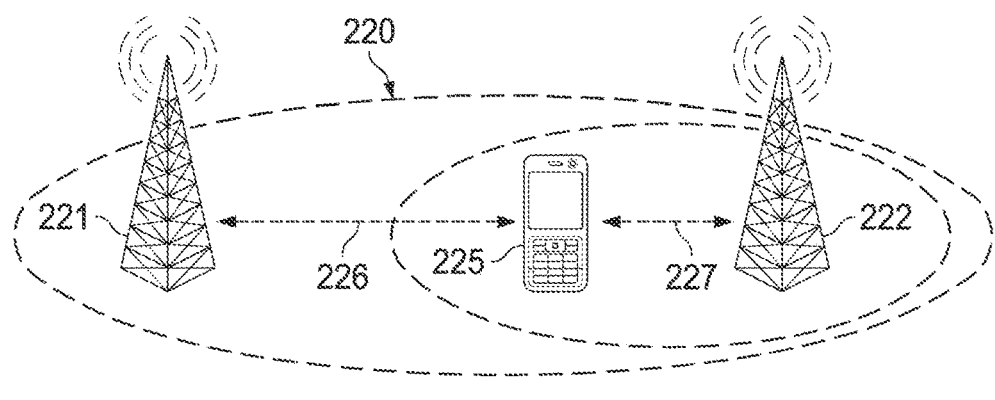
FIG. 3 illustrates an embodiment wireless heterogeneous network for carrier aggregation and carrier switching.

In modern wireless networks, base stations may be grouped together to form a cluster of base stations. Each base station in the cluster may have multiple antennas, and may be providing wireless access to multiple mobile devices in a wireless coverage area of the corresponding base station. Resources may be assigned to the mobile devices based on a scheduling algorithm, e.g., proportional fairness, round robin, etc. FIG. 3 illustrates the wireless heterogeneous network (HetNet) 220 configured to support carrier aggregation and/or carrier selection. As shown, the base stations 221 and 222 communicate with the mobile device 225 over different component carriers 226 and 227, respectively. The base station 221 may be a high-power node (e.g., a macrocell), and the base station 222 may be a low power node, e.g., a picocell, femtocell, microcell, relay, remote radio head (RRHs), remote radio unit, distributed antennas, etc. Accordingly, the base station 222 may have a smaller coverage area than the base station 221. Low-power nodes may provide improved cellular coverage, capacity and applications for homes and businesses, as well as metropolitan and rural public spaces.

Figure 4:
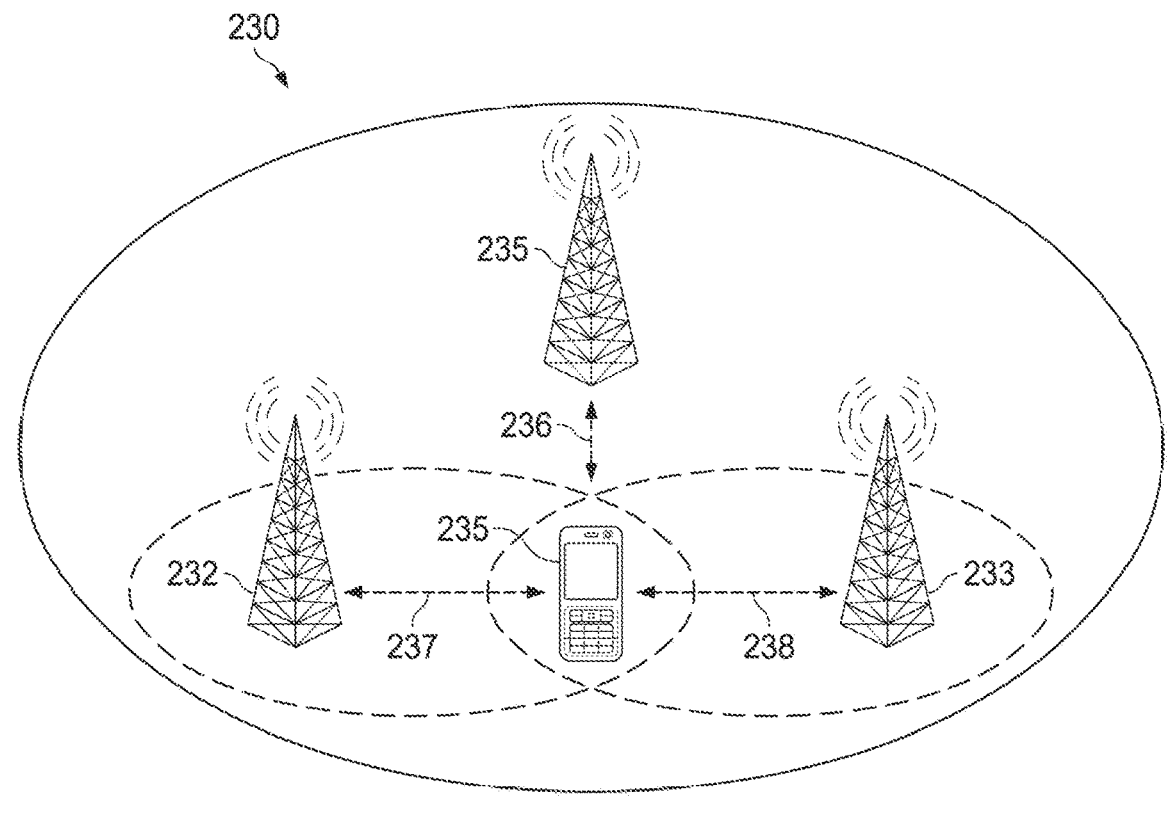
FIG. 4 illustrates another embodiment wireless heterogeneous network for carrier aggregation and carrier switching.

FIG. 4 illustrates another wireless HetNet 230 configured to support carrier aggregation and/or carrier selection. As shown, the base stations 231, 232, and 233 communicate with the mobile device 235 over different component carriers 236, 237, and 238, respectively. The base station 231 may be a high-power node (e.g., a macrocell), and the base stations 232 may be a low power node, e.g., a picocell, femtocell, micro-cell, relay, RRHs, remote radio unit, a distributed antennas, etc.

Although FIGS. 3 and 4 depict base stations communicating with a mobile device over different component carriers, it should be appreciated that, in some implementations, base stations in a Het-Net may communicate with a mobile device over the same component carriers.

Some Het-Nets have multiple high-power nodes and/or multiple low-power nodes operating over multiple component carriers. Nodes in the same Het-Net may be interconnected by fast or slow backhaul connections depending on the deployment. Fast backhaul connections may be utilized to improve coordination between the nodes, such as to effectuate joint-transmission/reception. Multiple remote radio units may be connected to the same base band unit of the eNodeB by fiber cable to support relatively low latency communications between base band unit and remote radio unit. In some embodiments, the same base band unit processes coordinated transmission/reception of multiple cells. For example, a base band unit may coordinate a joint transmission (e.g., a coordinated multiple point (CoMP)

transmission) from multiple base stations to a mobile device transmissions of multiple cells to a terminal to effectuate a CoMP transmission. As another example, a base band unit may coordinate a joint reception of a signal communicated from a mobile device to multiple base stations to effectuate a CoMP reception. Fast backhaul connections may also be used to coordinate joint scheduling between different base stations. Densely deployed networks are an extension of HetNets, and include relatively large numbers of densely deployed low power nodes to provide improved coverage and throughput. Densely deployed networks may be especially well-suited for indoor and/or outdoor hotspot deployments.

Figure 5:
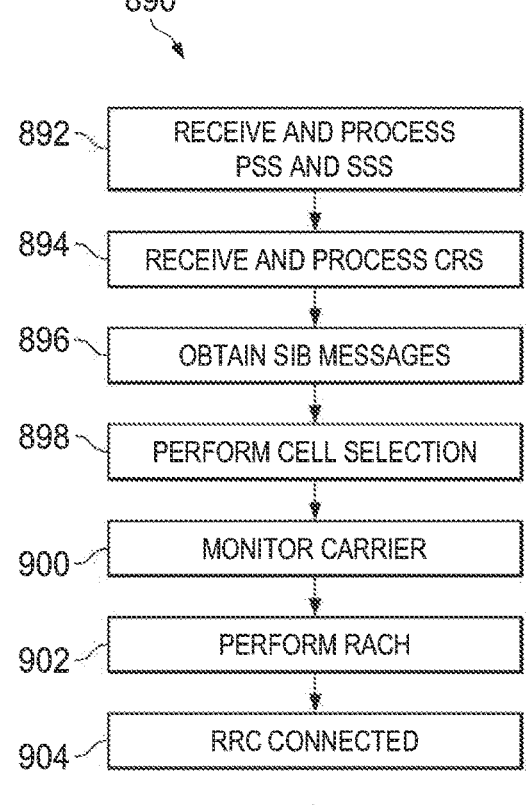
FIG. 5 illustrates the flowchart 890 for a method of processing signals in Long Term Evolution (LTE)

In a wireless network, reference signals, data signals, and control signals may be communicated over orthogonal time-frequency resources. For example, the signals may be mapped to different resource elements (REs) in a resource block (RB) of a radio frame. FIG. 5 illustrates the flowchart 890 for a method of processing signals in Long Term Evolution (LTE). A mobile device receives and processes a primary synchronization signal (PSS) and a secondary synchronization signal (SSS), in the block 892, to determine a cell identity and a frame timing of a physical broadcast channel. The mobile device, in the block 894, receives and processes a cell-specific reference signal (CRS) of the physical broadcast channel, to obtain channel information. In the block 896, the UE obtains SIB system information broadcast (SIB) messages. The mobile device receives and processes a physical broadcast channel (PBCH), to obtain system information broadcast (SIB) messages for one or more carriers. Also, the mobile device receives downlink control information (DCI) in the physical downlink control channel (PDCCH), which points to physical downlink shared channel (PDSCH) carrying the SIB messages (or in general, the data). The SIB messages are used by the mobile device to obtain cell-common configuration information associated with the corresponding component carriers. The DCI may indicate transmission parameters for SIB or PDSCH, such as modulation and coding scheme (MCS) parameters, used to transmit the candidate carriers. The mobile device processes CRSs in the candidate carriers to estimate channel quality associated with each of the candidate carriers.

Next in the block 898, the mobile device performs cell selection based on the channel quality information. The mobile device begins to monitor the selected carrier in the block 900, and performs a random access transmission (RACH) uplink transmission to request that resources of the selected carrier be scheduled to the mobile device in the block 902. Then, the mobile device transitions from an RRC_IDLE mode to an RRC_CONNECTED mode, and the mobile device is RRC connected, in the block 904, for example by exchanging messages with a base station associated with the respective carrier.

In LTE, the UE density is generally higher than the carrier density. In some scenarios in new radio (NR), the UE density may be higher, or much higher, than the carrier density. A higher UE density is conducive to downlink (DL) based measurements. In other scenarios in NR, the carrier density is higher, or much higher, than the UE density. A higher carrier density is conducive to uplink (UL) based measurements and UE oriented access.

A NR network includes standalone (SA) carriers which support an initial access procedure and non-standalone (NSA) carriers which do not support the initial access procedure. SA carriers support initial access procedures, such as transmitting synchronization sequences (SS) directly discoverable by the UE and related functions. On the other hand, NSA carriers do not support initial access procedures. By utilizing NSA carriers, a wireless network can reduce costs and complexities in the system. In a high density network, fewer carriers are SA carriers and more carriers are NSA carriers. NSA carriers may be accessed with some assistance from SA carriers.

In LTE, a cell specific design with physical cells is used. The PCID is heavily relied on, and is carried in the SS or CRS. The SS or CRS is used for cell identification, coarse time/frequency tracking, fine time/frequency tracking, RRM measurement, CSI measurement, PDCCH demodulation, and PDSCH demodulation.

NR supports high-frequency carriers with narrow beam transmission, possibly via analog beamforming. Additionally, NR operates with lightweight carriers with reduced common overhead. The use of lightweight carriers supports dense networks with increased flexibility.

Some embodiments do not use a CRS. Not using a CRS may reduce interference and improve flexibility. The functionalities of CRS, for example cell identification, coarse time/frequency tracking, fine time/frequency tracking, radio resource management (RRM) measurements, channel state interference (CSI) measurements, and demodulations are performed by signals other than the CRS. In an embodiment, transmissions and receptions are UE-oriented, and not cell specific. Additionally, in an embodiment, the use of a physical cell identifier (PCID) is reduced.

Physical layer procedures include initial access procedures and connected mode procedures. Initial access is limited to SA carriers, while connected mode procedures may be performed by both SA carriers and NSA carriers. Initial access may rely on DL signals, for example for time/frequency synchronization. For example, a UE may search for initial access SS as a first step, which is sent by a SA carrier, for example a macrocell. The SS may be periodic with a very low overhead. A discovery reference signal (DRS) or a longer-periodicity initial access RS may also be transmitted to the UE periodically. The SS and/or the DRS may use a PCID for scrambling. Multiple SA carriers may transmit the same SS on the same time/frequency resources, to form a hypercell, covering multiple carriers. Additionally, the SA transmits a PBCH. Then the UE may decode the PBCH and/or SIBs based on the SS and the DRS or the longer-periodicity initial access RS. The SA carrier may also transmit SIBs. In one example, the SA carrier only transmits some of the SIBs. Based on the PBCH or the SIBs, the UE obtains the coarse time/frequency synchronization, and is ready to connect to a carrier, which may be an SA carrier or an NSA carrier. The UE may transmit an uplink signal, for example an initial uplink beacon or RACH, to a carrier to establish connection to the network. In one example, the uplink signal is sent to the initial access SA carrier. In another example, the uplink signal is sent to another carrier, for example to an NSA carrier, or to a different SA carrier. The uplink beacon is used for uplink discovery, measurement, and connection establishment. The network responds to the uplink beacon with UE specific information, such as additional SIBs, other configuration signaling, virtual cell identifiers (VCIDs), and UE identifiers (UEIDs) for one or more than one carrier. A VCID is a radio resource control (RRC) or physical layer (PHY) configurable identifier not associated with a PCID or a UEID. The VCID may be used for one or more than one UEs. The VCID may be referred to as a UE-group ID, because the VCID is not necessarily associated with a cell. Additionally, the VCID may be referred to as a shared ID, because it may be used for multiple UEs. However, from the perspective of the UE, the UE may not be aware, and may not need to be aware, that the ID us shared by other UEs. The UE sees the shared ID as a configurable ID, as opposed to fixed ID not configurable, such as the PCID.

Once a UE is connected to the network, it maintains connection with a carrier, which may be the initial access carrier or another carrier. To maintain the connection with the carrier, the UE may perform measurements, such as RRM measurements and CSI measurements, receive and transmit control and data channels, and perform other communications. The RRM measurement may be based on a long-term reference signal (RS), such as a DRS which is configured for the UE. Likewise, the CSI measurement may be based on a CSI reference signal (CSI-RS) configured for the UE. Control and data demodulation may be based on a demodulation reference signal (DMRS) configured for the UE. The UE-specific DRS, CSI-RS, and DMRS may contain a VCID and/or a UEID.

A UE may establish a connection to another carrier after it is connected to a carrier. In one example, the network configures other carriers to the UE based on a DL RS configured to the UE. Configuring carriers based on a UE specific DL RS is well suited for a high UE density. In another example, the UE transmit an UL beacon, so other carriers can discover and connect to the UE. The use of an UL beacon is well suited when the network node density is high. The UL beacon may be a UE specific UL beacon with VCIDs and/or UEIDs for RRM and CSI measurements.

A variety of scrambling identifiers, including PCIDs, UEIDs, UE-group IDs, and VCIDs, may be used in reference signals. It is preferable to use the PCID in a limited capacity, because the PCID is not flexible. Additionally, it is important for the scrambling IDs to be sufficient to adequately differentiate transmissions and receptions. The PCID is an identifier of a cell that may be used for broadcasting. The PCID is generally static. While it is desirable to reduce the use of the PCID, the PCID is important for carriers to broadcast initial access SS and initial access DRS. Other signaling may also use a PCID. A UEID is assigned to a UE by the network for UE-specific procedures and signals. For example, a UEID is used for UE specific CSI-RS for CSI measurement, UE specific control channels, and UE specific data channels. The UEID is not well suited to identify carrier connections when multiple carriers (or TRPs or the like) are associated with the same UE at the same time. A UE group ID may be used, where different carriers use different UE group IDs. For example, a first carrier transmits a CSI-RS or DMRS to the UE with UE-group ID 1, and a second carrier transmits a CSI-RS or DMRS to the same UE with UE-group ID 2. In another example, the same carrier may form different beams, and different UE-group IDs may be used to differentiate transmissions associated with different beams. In an additional example, multiple UEs are served by a common carrier, and that carrier transmits a common CSI-RS to all of the UEs with a common ID (i.e., a shared ID or UE group ID). In multiple-user multiple-input multiple-output (MU-MIMO), the DMRS for the multiple UEs may share the same sequence, and the UEIDs are not adequate to differentiate the UEs. A VCID may be used to differentiate different carriers and different UEs. A scrambling common to the group of UEs may be used, such as a UE-group ID. The UE-group ID is a configurable ID not associated with the PCID or the UEID which may be used for one or more UEs, to provide flexibility. One UE may be associated with a set of UE-group IDs, and one carrier may be associated with a set of UE-group IDs.

Figures 6, 7:
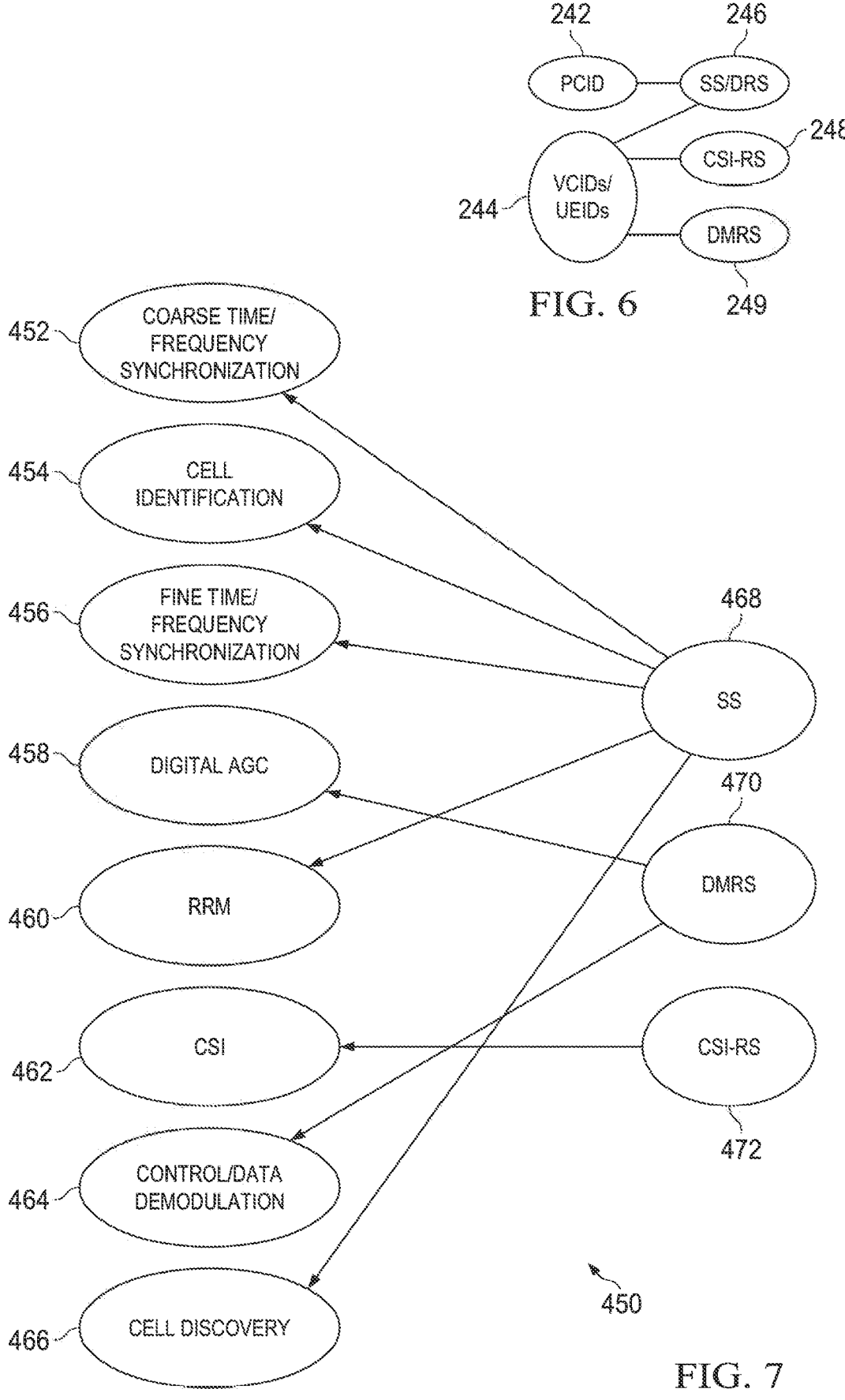
FIG. 6 illustrates a diagram for embodiment identifiers and reference signals for network access.
FIG. 7 illustrates a diagram for embodiment reference signal usage for network access.

An embodiment network uses a UE-specific design for reference signals. In an embodiment, the initial access to an SA cell uses a PCID, but the PCID is not used after connecting to the network. FIG. 6 illustrates the mapping 240 for of scrambling identifiers and reference signals in an embodiment network. The SS/DRS 246 includes both a standalone scrambling identifier, the PCID 242, and a configurable scrambling identifier, the VCIDs/UEIDs 244. The SS/DRS 246 is used for cell identification, time/frequency tracking, and RRM measurement. The CSI-RS 248, which contains configurable scrambling identifiers, VCIDs/UEIDs 244 and does not contain the PCID 242, is used for CSI measurement and beam management. Additionally, the DMRS 249 contains the VCIDs/UEIDs 244, is used for PDCCH demodulation and PDSCH demodulation.

In LTE, a variety of reference signals perform a variety of functions. The UE acquires coarse time/frequency synchronization and cell identification by detecting a SS, such as a PSS and an SSS. Cell identification is also partially carried out through the CRS by a PBCH demodulation reference signal. The CRS also carries functionalities for digital automatic gain control (AGC), fine time/frequency synchronization, and RRM measurement. Additionally, the CRS provides data demodulation reference signals for transmission modes 1-6 and control demodulation reference signals for all transmission modes except enhanced PDCCH (EPDCCH) demodulation. For CSI measurements, the CRS is used for deriving the signal part for transmission modes 1-8 and the interference part for transmission modes 1-9. Additionally, the CSI-RS is used in transmission modes 9 and 10 for measuring signal quality. The DMRS is the data demodulation reference signal for transmission modes 7-10 and EPDCCH control channel demodulation reference signal. Also, the DRS includes the SS, the windowed CRS, and, optionally the CSI-RS. The DRS carries the functionality of cell discovery and RRM measurement.

In LTE, quasi co-location (QCL) is defined with respect to delay spread, Doppler spread, Doppler shift, average gain, and average delay. LTE defines several QCL assumptions for the reference signals. The CRS ports of the serving cell are assumed to be quasi co-located with respect to delay spreading, Doppler spreading, Doppler shift, average gain, and average delay. The CSI-RS and DMRS ports, and the CRS ports they are tied to, are assumed to be quasi co-located with respect to Doppler spread, Doppler shift, delay spread, and average delay. Also, the SS port and CRS ports are assumed to be quasi co-located with respect to Doppler shift and average gain. The long term channel characteristics derived from CRS can be used for the reception of the target signals when they are assumed to be quasi co-located.

FIG. 7 illustrates the diagram 450 for an embodiment reference signal design. The SS 468 is enhanced with sufficient time/frequency density to carry a variety of functions. For example, the SS 468 is used for coarse time/frequency synchronization 452, cell identification 454, fine time/frequency synchronization 456, RRM 460, and cell discovery 466. The SS is transmitted periodically to support mobility. Also, the DMRS 470 is used for control/data demodulation 464. Additionally, the DMRS 470 is enhanced to perform digital AGC 458. In another example, a preamble signal, which may be an enhanced DMRS or a different signal, is used for the digital AGC 458. Also, the CSI-RS 472 is used for CSI 462. The CSI-RS 472 may be enhanced to support better MU-MIMO performance. In an embodiment, the CSI-RS port, DMRS port, and the SS port are quasi co-located with respect to delay spread, Doppler spread, Doppler shift, and average delay.

Additional details on an enhanced DMRS and preamble are discussed in U.S. patent application Ser. No. 14/819,294 filed on Aug. 5, 2015, and entitled "Device, Network, and Method for Communications with Fast Adaptive Transmission and Reception," which application is hereby incorporated herein by reference.

Figure 8:
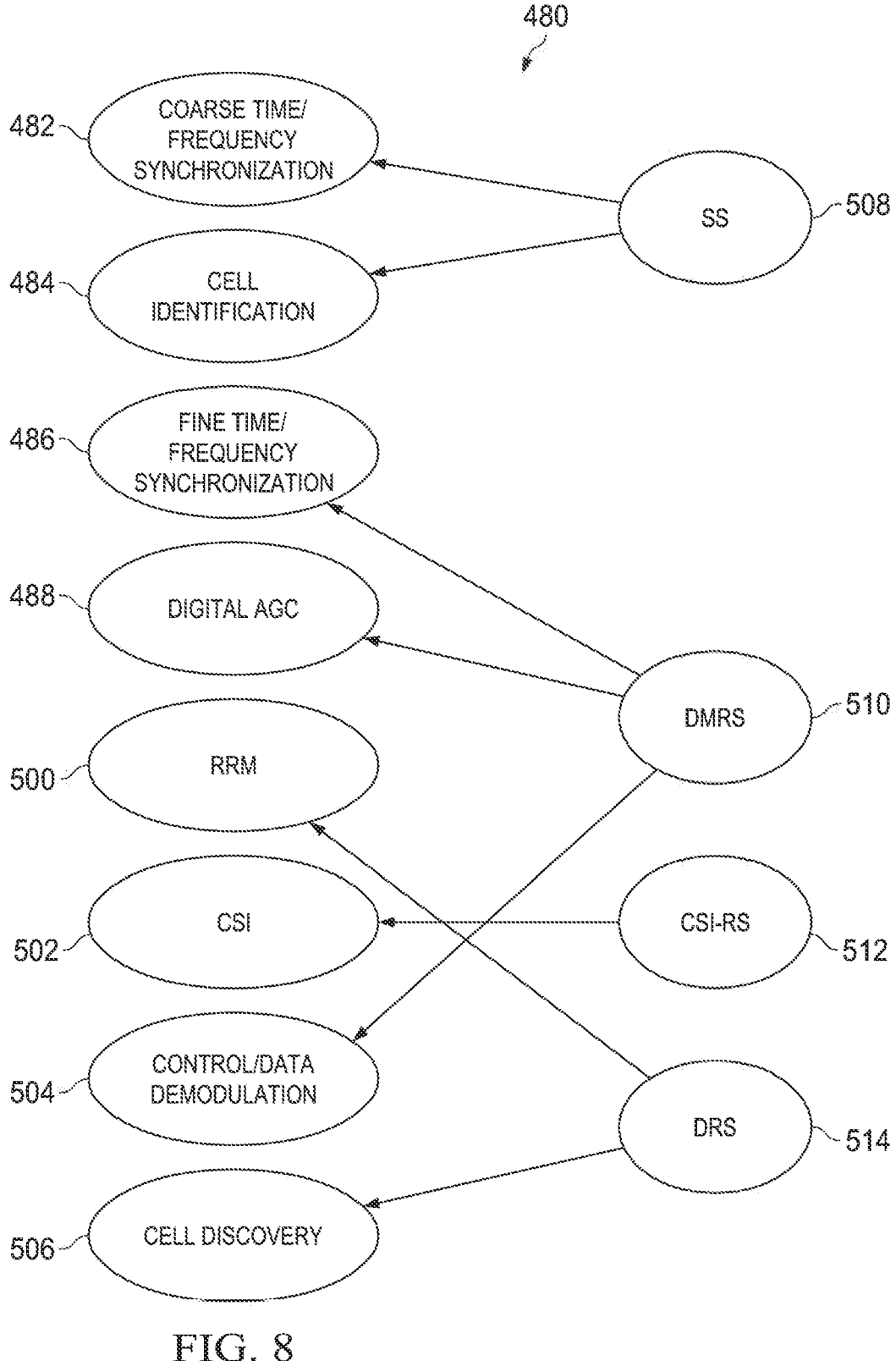
FIG. 8 illustrates another diagram for embodiment reference signal usage for network access.

FIG. 8 illustrates the diagram 480 for another embodiment reference signal design. The CSI-RS 512 is used to perform CSI 502. Additionally, the DRS 514 is used for RRM 500 and cell discovery 506. The SS 508 is used for coarse time/frequency synchronization 482 and cell identification 484. The DMRS 510 performs control/data demodulation 504 and digital AGC 488. Additionally, the DMRS is enhanced to support fine time/frequency synchronization 486. The delay spread, Doppler spread, Doppler shift, average delay, and average gain are derived from the DMRS or from the preamble. The DMRS transmission is mostly self-contained with a weak QCL relationship with the SS or the DRS, for example rough similarities in timing relationships. Self-contained transmission may be well suited for multi-point transmission, but has increased overhead. In one embodiment, the DMRS or preamble is only transmitted for the initial portion of a large transmission, which may reduce overhead.

Figure 9:
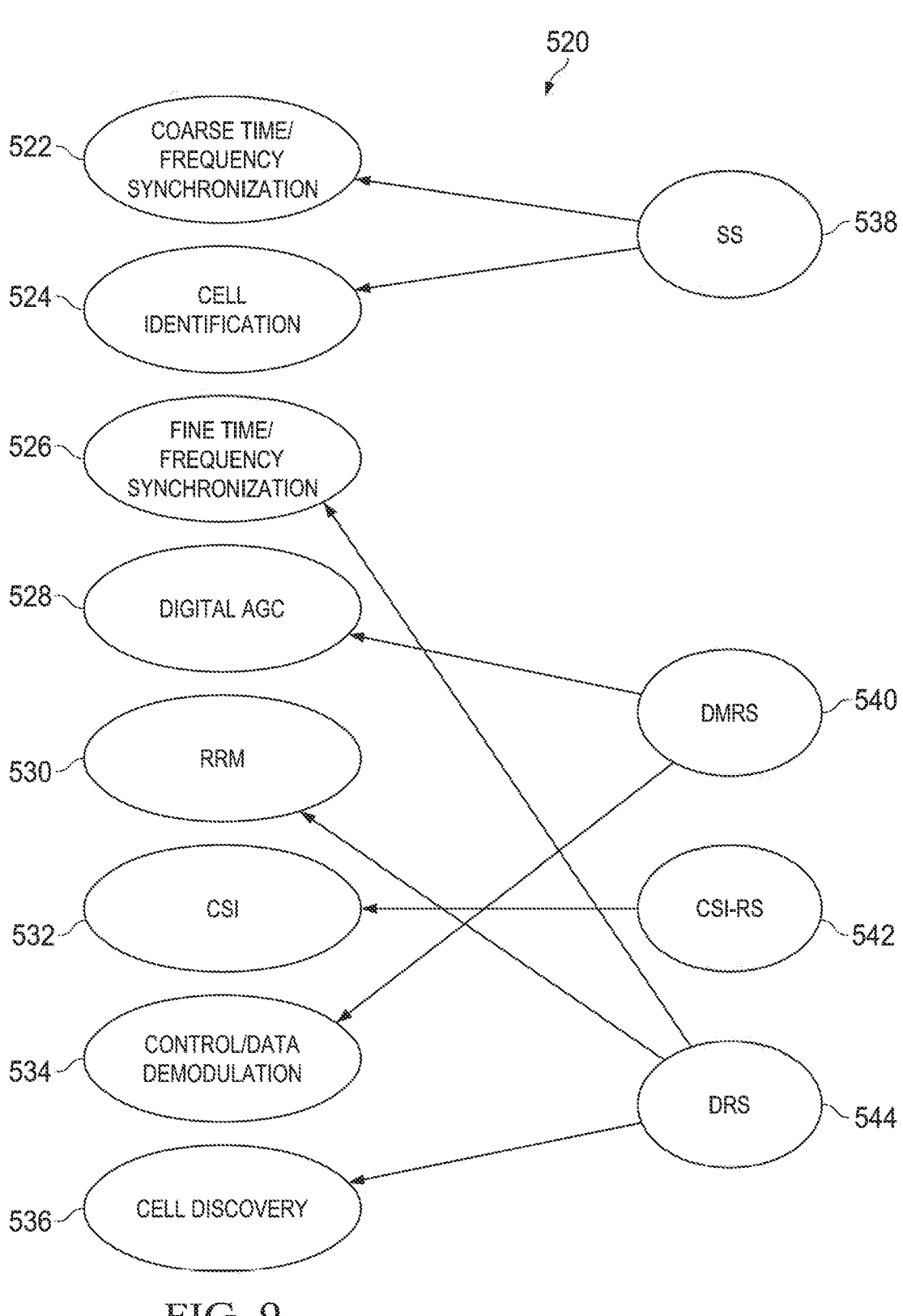
FIG. 9 illustrates an additional diagram for embodiment reference signal usage for network access.

FIG. 9 illustrates the diagram 520 for an additional embodiment reference signal design. The DRS 544 is used for cell discovery 536 and for RRM 530. Additionally, the DRS 544 is enhanced to perform fine time/frequency synchronization 526. In one embodiment, the DRS also contains CRS-like or CSI-RS like signals. The DRS is transmitted with a long periodicity to reduce overhead. The DRS may be wideband with longer periodicity. In an embodiment the DRS has a different time/frequency density and periodicity than the SS 538. The SS 538 performs coarse time/frequency synchronization 522 and cell identification 524. Also, the SS may be enhanced to facilitate PBCH demodulation. The SS, which is wideband with a high density, may be transmitted with a short periodicity to support mobility. The DRMS 540 is used for digital AGC 528 and control/data demodulation 534. Additionally, the CSI-RS 542 is used for CSI 532. The CSI-RS port, DMRS ports, and DRS ports are quasi co-located with respect to delay spread, Doppler spread, Doppler shift, and average delay.

Figure 10:
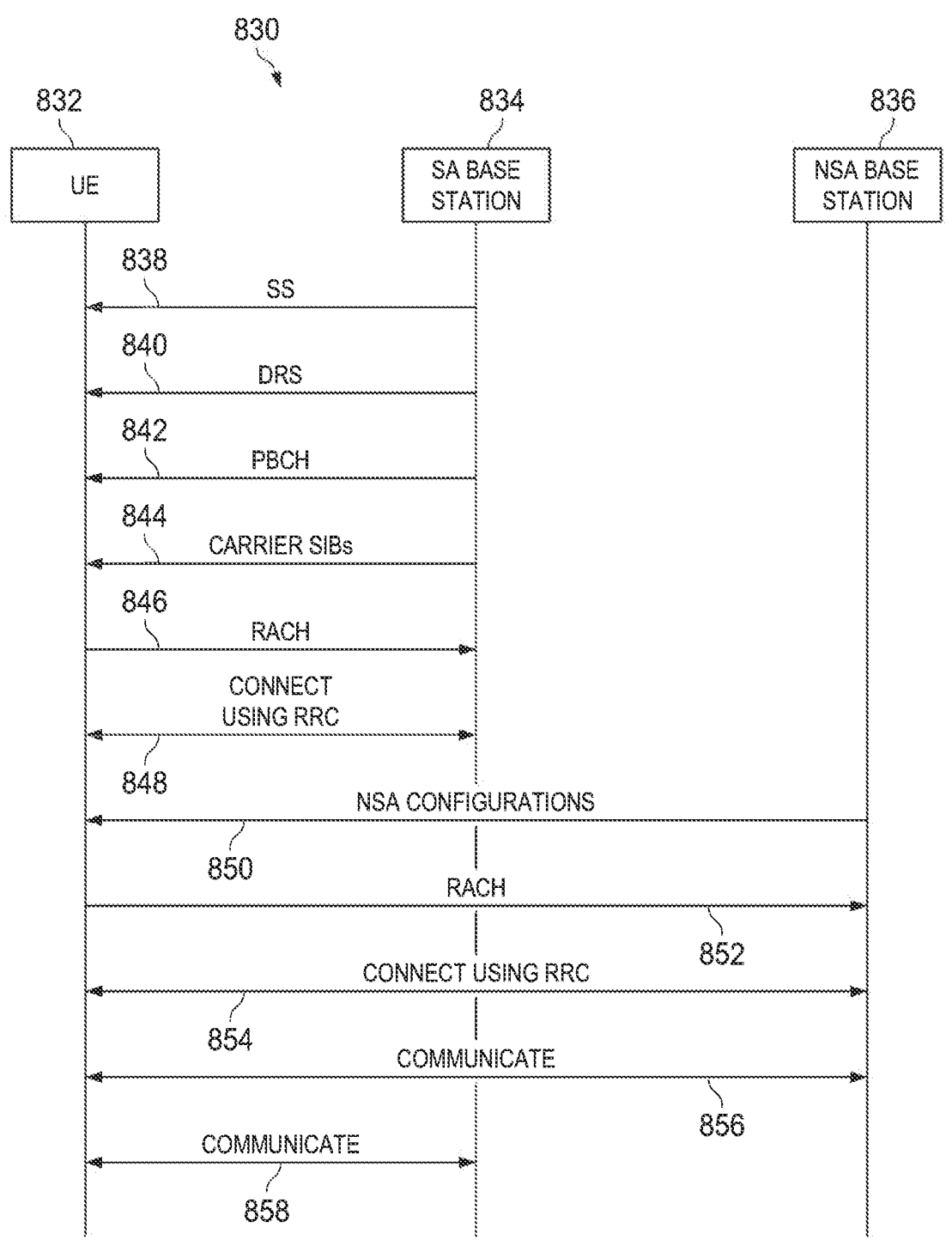
FIG. 10 a message diagram for an embodiment method for network access.

FIG. 10 illustrates the message diagram 830 for an embodiment method of network access. Signals are exchanged between the UE 832, the SA base station 834, and the NSA base station 836. In some embodiments, the SA base station 834 and the NSA base station 836 are the same base station. In other embodiments, the SA base station 834 and the NSA base station 836 are different base stations. The UE 832 is a UE seeking to connect to a carrier. The SA base station 834 broadcasts the SS 838, the DRS 840, and the PBCH 842. These reference signals, which include a PCID, are received by the UE 832. The SA base station 834 may also transmit SIBs 844 to the UE 832. The UE 832 responds by transmitting the RACH 846 to the SA base station 834, indicating that the UE 832 wants to connect to a carrier. Then, the UE 832 and the SA base station 834 connect using RRC signaling 848. After connecting to the SA base station 834, the UE 832 receives NSA configurations 850 from the NSA base station 836. The UE 832 responds to the NSA base station 836 with the RACH 852. Then, the UE 832 connects to the NSA base station 836 using the RRC signaling 854. After the UE 832 connects to the NSA, the UE 832 and the NSA base station 836 communicate 854 using the NSA carrier. The UE 832 may also communicate 858 with the SA base station 834 using the SA carrier.

Figure 11:
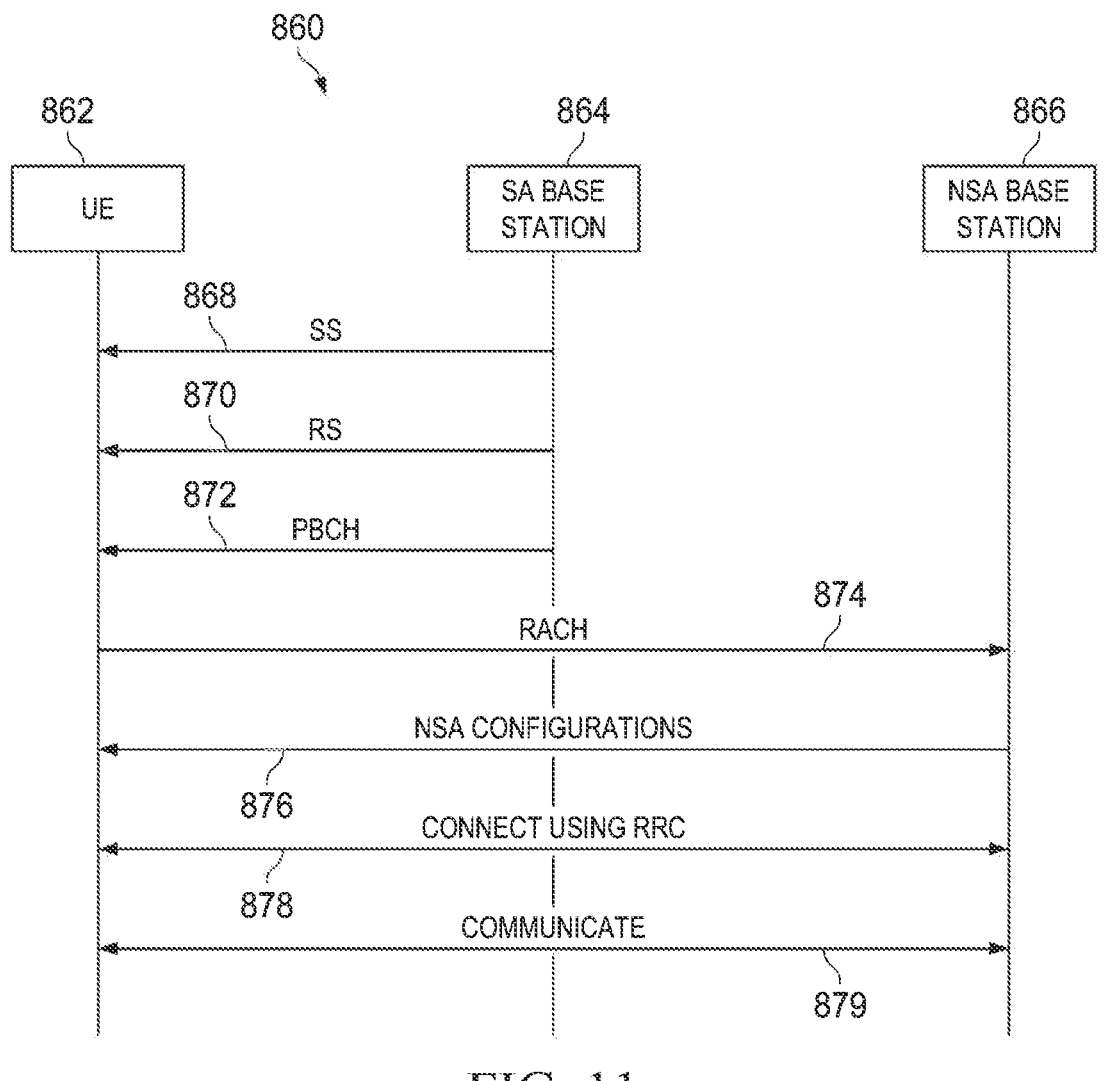
FIG. 11 a message diagram for another embodiment method for network access.

FIG. 11 illustrates the message diagram 860 for an embodiment method of network access. Signals are exchanged between the UE 862, the SA base station 864, and the NSA base station 866. In some embodiments, the SA base station 864 and the NSA base station 866 are the same base station. In other embodiments, the SA base station 864 and the NSA base station 866 are different base stations. The UE 862 seeks to connect to a carrier. The SA base station 864 broadcasts the SS 868, the RS 870, and the PBCH 872, which are received by the UE 862. The SA base station 864 may also broadcast SIBs, which are received by the UE 862. The PBCH 872 and the SIBs may include configuration information for the UE to RACH to the NSA base station 866. In response, the UE 862 transmits the RACH 874 to the NSA base station 866, seeking to connect to the NSA carrier, without connecting to the SA carrier. The NSA base station 866 responds with the NSA configurations 876. Next, the UE 862 and the NSA base station 866 connect using the RRS signaling 878. Then, the UE 862 and the NSA base station 866 communicate 879 on the NSA carrier. In an embodiment, the UE 862 does not connect to the SA carrier.

An embodiment supports frequencies up to 100 GHz, which may lead to significant path loss. To combat this path loss, hybrid antenna beamforming may be used, which may have a good balance of complexity and performance. A hybrid antenna structure with a large number of antenna elements strikes a good balance between complexity and performance. Analog beamforming provided by an antenna panel may effectively compensate the significant signal path loss at high frequency bands. New or modified reference signal design may support analog beam management, for example beam acquisition and beam tracking. There may be multiple stages of beam acquisition. For example, initial wider beam acquisition is performed in the first stage, and beam refinement is performed in later stages. Beam tracking includes transmit beam tracking and receive beam tracking, which may involve different reference signal designs. Thus, a set of reference signals may be used to fulfill various beam management functionalities. To reduce overhead, beam management reference signals other than cell-specific coarse beam sweeping may be UE-specific.

Significant bandwidth is available at high frequency bands, which may support high data rates. Phase noise is an issue for communications systems using a high carrier frequency band. Compared to a low frequency band, the phase noise is larger in a high frequency band. Performance degradation caused by phase noise may be reduced by increasing the subcarrier spacing. However, larger subcarrier spacing leads to shorter symbol length and larger cyclic prefix (CP) length overhead. Thus, it is problematic to increase the subcarrier spacing too much. To achieve low latency demodulation may start early, and may involve DMRS being placed at the beginning of the transmission time interval (TTI) symbols.

Figure 12:
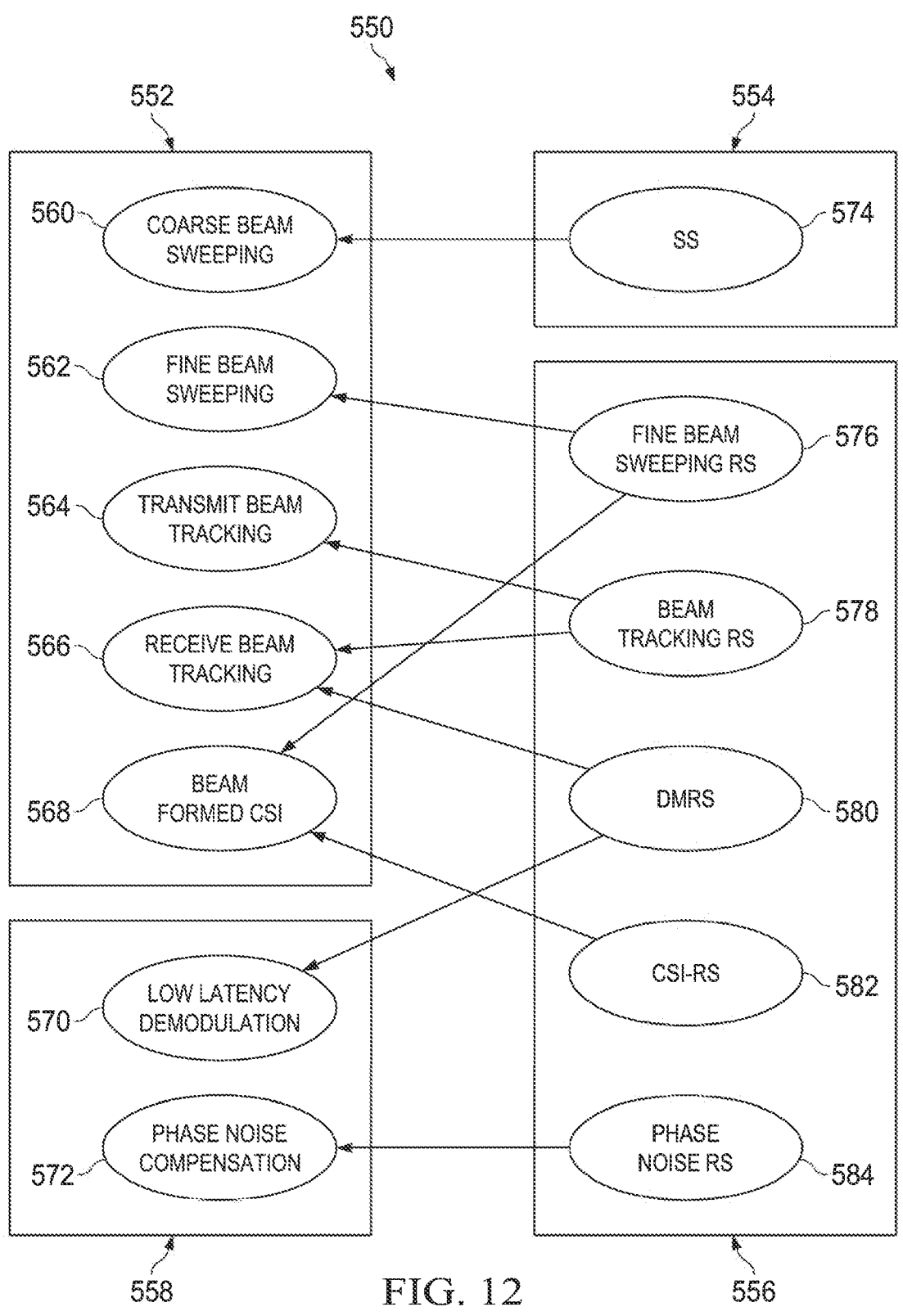
FIG. 12 illustrates an embodiment mapping of high frequency functionalities for network access.

FIG. 12 illustrates the diagram 550 for an embodiment mapping of reference signals to high frequency functionalities. Cell-specific reference signals 554 include the SS 574, while UE-specific reference signals 556 include the fine beam sweeping RS 576, the beam tracking RS 578, the DMRS 580, the CSI-RS 582, and the phase noise RS 584. The functionalities include analog beam management 552 and demodulation 558. The analog beam management 552 includes coarse beam sweeping 560, fine beam sweeping 562, transmit beam tracking 564, receive beam tracking 566, and beam formed CSI 568. Also, demodulation 558 includes low latency demodulation 570 and phase noise compensation 572. The SS 574 is used for coarse beam sweeping 560. Fine beam sweeping 562 is performed using the fine beam sweeping RS 576. The fine beam sweeping RS is also used for beam formed CSI 568. The CSI-RS 582 is also used for beam formed CSI 568. The beam tracking RS 578 is used for transmit beam tracking 564 and for receive beam tracking 566. Additionally, the DMRS 580 is used for receive beam tracking 566. The DMRS is also used for low latency demodulation 570. Additionally, the phase noise RS 584 is used for phase noise compensation 572.

Figures 13, 14:
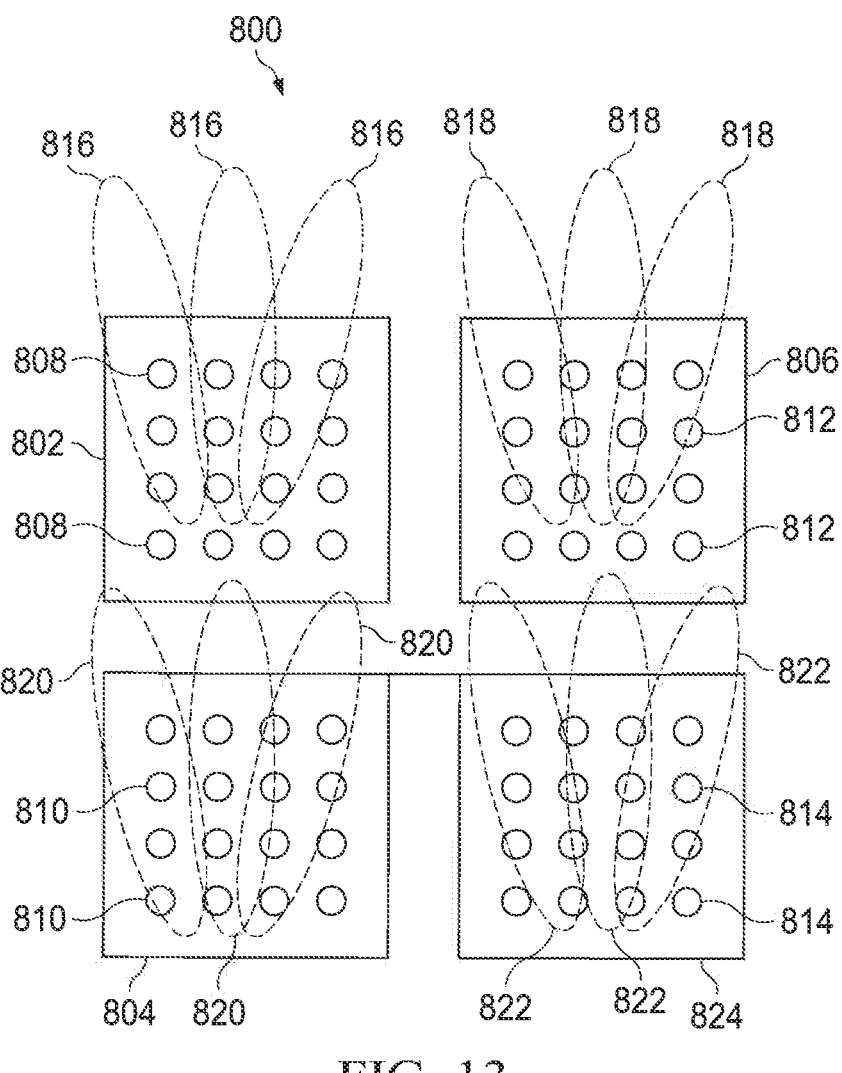
FIG. 13 illustrates embodiment antenna panels with quasi co-located beams.
FIG. 14 illustrates a flowchart for an embodiment method of performing path loss estimation, performed by a base station.

At high frequencies, more than one antenna panel may be implemented at the transmitter side and at the receiver side. Reference signals transmitted from different beams and different antenna element arrays travel through different effective channels, even with a single carrier and a single UE. When there are no assumptions about the beamforming relationships of beams, beam management of each antenna panel is performed independently. However, when the antenna element arrays are closely located, with the same spatial orientation and calibration, beam acquisition time can be reduced by simultaneously transmitting different beams from different antenna panels with the assumption that beams with the same beamforming, or spatial direction, from these different antenna panels have the same long term channel properties, or beam direction uniformity. FIG. 13 illustrates the antenna panels 800 which produce quasi co-located beams from different antenna panels. The antenna panel 802, which has the antenna elements 808, produces beams 816, the antenna panel 806, which has the antenna elements 812, produces beams 818, the antenna panel 804, which has the antenna elements 810, produces beams 820, and the antenna panel 824, which has the antenna elements 814, produces beams 822. The beams 816, 818, 820, and 822 are quasi co-located, and are produced with the same or similar beamforming, to have beam direction uniformity. Different beam directions in high frequency may experience different channel condition when beamforming is applied. For example, delay spread, average gain, and average delay of beams may be different, although these channel properties may be the same before beamforming is applied. The beam antenna ports are quasi co-located with respect to beam direction uniformity, Doppler shift, and Doppler spread. In some examples, the beam antenna ports are also quasi co-located with respect to delay spread, average gain, and average delay.

In LTE, UL power control (PC) balances uplink interference management and uplink throughput performance. In LTE, UL PC is based on DL path loss estimates, which are obtained based on the CRS. UL PC is also supported by some embodiments without the use of a CRS.

In an embodiment, UL PC estimation is based on beam-based transmissions and receptions. Transmissions and receptions may be based on beams, possibly very narrow beams. Beams may be especially narrow in high frequency and massive MIMO scenarios. Also, the beam widths, and hence the beamforming gains, between the same carrier and the UE can vary significantly for different times and different channels. A narrow-beam uplink transmission is not likely to interfere with another carrier's narrow-beam transmission. Accordingly UL PC requirements might be relaxed when narrow beams are being used. However, there may be variations in receive power due to the use of different beamforming. For example, received power may be higher for narrower beams.

In a high frequency embodiment, analog beamforming may be used at a base station and a UE. To transmit and receive with analog beamforming, the analog direction must be known before the transmission and reception occurs. This is well suited for scheduled transmissions and receptions, such as a physical uplink control channel (PUSCH). However, non-scheduled uplink transmissions, such as contention-based RACH and grant-free uplink signals, can only be received with a wider analog beam at the carrier with no or low analog beamforming gain. With the reduced beamforming gain, the UE UL transmission power level is set accordingly, i.e., a higher transmission power is used for a wider beam to compensate the lower gains compared to a narrow beam.

Embodiments may use uplink coordinated multi-point (CoMP). In LTE, one UL PC setting based on the serving cell is used by a UE for all carriers. Hence, the received signal power levels at some carriers may be higher or lower than desired.

A UE may support multiple numerologies. In an embodiment, an uplink beacon may be transmitted by a UE, so neighboring carriers can discover the UE without relying on downlink of the carriers. In this scenario, the UE does not know the targets of the transmission or the PL estimate.

Dynamic time division duplex (D-TDD) may use UL PC to reduce UE-UE interference. D-TDD is a flexible and dynamic evolution of dynamic TDD for LTE-A (eIMTA). However, dual-loop UL PC enhancement, where a subframe is set dependent, may be problematic with D-TDD.

In an embodiment, a fractional power control (FPC) provides a general framework which for an orthogonal frequency division multiplexing (OFDM) or single carrier frequency division multiplexing (SC-FDM) based system. The general form of UE transmission power is:

$$P(i) = \min \left\{ \begin{array}{l} P_{CMAX}(i), \\ 10 \ \log_{10}(M(i)) + P_O(j) + \alpha(j) \cdot PL + \Delta_{TF}(i) + f(i) \end{array} \right\},$$

where the formula captures the UE maximum power, bandwidth allocation factor, open-loop power control, modulation and coding scheme (MCS) factor, and closed-loop offset are captured. This comprehensive and flexible mechanism may be used as the baseline for the framework of NR UL PC. In particular, on a carrier (otherwise known as cell, or bandwidth part in NR) in subframe i, P(i) is the transmission power to be used in the transmission, $P_{CMAX}(i)$ is the configured UE transmit power in subframe i for the carrier, M(i) is the bandwidth factor, $P_o$ is the open-loop PC offset parameter, a is the open-loop PC scaling parameter, PL is the pathloss estimate, $\Delta_{TF}(i)$ is the MCS factor, f(i) is the closed-loop PC adjustment state (otherwise known as loop state, loop status, or loop status value). When accumulation is configured, i.e., f(i)=f(i−1)+δ(i−K), the δ is the closed-loop correction value, otherwise known as the transmit power control (TPC) command, and f(i) is the loop state. On the other hand, when accumulation is not configured, i.e., absolute closed-loop PC, f(i)=δ(i−K), then the loop state is the δ or the TPC command, and the loop is memory-less. Multiple subframe sets can be configured, and each subframe set can use one set of the open-loop PC parameters (α, $P_o$), its own loop state, but the subframe sets may share the same PL and δ (TPC command).

In one embodiment, PL estimation is based on DRS, SS, non-UE specific DL RS, and/or another long-term DL RS. PL estimation may be beam-specific. Additionally, narrow-beam DL RS may not provide a robust PL estimate. Accordingly, wide-beam DL RS may be used for PL estimation, which may lead to a higher than necessary UL transmission power compared to a narrow-beam transmission. However, this wider beam might not interfere with the carriers due to the narrow beam nature of the other transmission. To support grant-free uplink transmission, the carrier reception may use a wide analog beam. Hence, the UL PC for grant-free transmission is not based on narrow-beam DL-RS. Wide-beam, long-term DL-RS, such as initial access SS, initial access RS, or configured RS spatially QCL with the initial access SS/RS in terms of beam direction and width, may be used for PL estimation and UL PC for grant-free uplink transmissions, including contention-based RACH and UL beacons. In an embodiment, a carrier-specific UL PC setting is used for UL CoMP. The UE applies different UL PC settings for different carriers. This may be generalized to cover multi-beam uplink transmissions. For multiple numerologies, multiple UL PC settings may be used. A UE with multiple uplink numerologies may support multiple numerology-specific UL PC settings. For uplink transmission without previous downlink reception, the UE cannot obtain the PL estimate. One option is that the serving base station transmits a PL estimate, or uplink transmission power value, to the UE. The signaled value may be estimated by the base station based on, for example, the carrier or network TRP density near the UE and other information.

FIG. 14 illustrates the flowchart 440 for an embodiment method of performing PL estimation performed by a base station. In the block 442, the base station determines a PL estimate for a UE. Then, in the block 446, the base station transmits the PL estimate to the UE.

FIG. 15 illustrates the flowchart 250 for an embodiment method of network access performed by a UE, where the UE searches for a carrier. This embodiment includes no CRS, and has a reduced reliance on the PCID. In the block 252, the UE wakes up.

After waking up, the UE receives, broadcast from a base station, an SS on an initial access SA carrier, in the block 254. The SS carries information of a PCID, i.e., it is generated to have a unique association with a PCID. The SS is used for cell search. The UE obtains the cell identity and performs coarse time/frequency synchronization based on the SS. The UE may also use the SS for coarse beam sweeping. In some embodiments, the SS is also used for cell discovery, fine time/frequency synchronization, and RRM.

In the block 256, the UE receives a RS, such as a DRS, on the initial access SA carrier, from the base station, where the RS is generated based on a PCID. The DRS may be used for cell discovery and for RRM. In some embodiments the DRS is also used for fine time/frequency synchronization. In other embodiments, the DRS is not received.

Also, in the block 258, the UE receives a PBCH on the initial access SA carrier from the base station. The PBCH also includes a PCID. The PBCH includes information on the RACH opportunities and sequences for NSAs. The PBCH transmits information, or the master information block (MIB), such as system bandwidth, system frame number, and the number of transmitting antennas.

After receiving initial access signaling on the initial access SA carrier, the UE connects to the SA carrier. In the block 260, the UE monitors control channels on the initial access SA carrier. Then, in the block 262, the UE receives carrier SIBs on the SA carrier. In an embodiment, only some of the SIBs are received in the block 262, and some SIBs may be received after RACHing to or connecting to a carrier. The SIBs may be associated with a PCID, for example the SIBs may be scrambled by a sequence generated from a PCID. The SIBs contain system information transmitted on a shared data channel. In another embodiment, all of the SIBs are received. In an additional embodiment, SIBs are not received and the block 262 is skipped.

The UE transmits a RACH to the base station on the initial access SA carrier in the block 264. The RACH indicates that the UE wants to connect to the initial access SA carrier.

Then, in the block 266, the UE establishes an RRC connection to the SA carrier. The UE receives a RACH response (RAR) from the base station, which may include an assigned ID. The UE responds to the base station with Message 3, which may include an RRC connection request and the assigned ID. In response, the UE receives an RRC connection setup message from the base station. The UE is now connected to the initial access SA carrier.

After connecting to the initial access SA carrier, the UE may further connect to an NSA carrier for enhanced/additional services, per network instruction or based on its own determination from RRM measurement results, QoS requirements, etc. In the block 268, the UE performs additional random access steps on the NSA. The UE receives NSA configurations from the initial access SA carrier, to which it is connected, or from one or more NSA carriers. The NSA configurations may include a VCID and/or a UEID. The NSA configurations may include SIBs and other signaling from the SA and/or NSA(s). The NSA carrier may be on the same base station as the initial access SA carrier. The NSA carrier may be on the same frequency band as the SA but with a different center frequency. In another embodiment, the NSA carrier has the same frequency band and the same center frequency as the SA carrier. In an embodiment, the NSA carrier has a different, for example larger, or configurable, bandwidth than the SA carrier. Additionally, the NSA carrier may have the same numerology as the SA carrier. Alternatively, the NSA carrier has different, or configurable, numerology than the SA carrier. Alternatively, the NSA carrier is on a different base station than the initial access SA carrier. In some embodiments, the NSA sends the SS or PBCH with configurations, for example frequency/time locations or periodicity, separately from the initial access SS, so the UE cannot discover these configurations based on searching the SS. However, the UE may receive the configurations from PBCH/SIB of the SA, and the UE may then access the NSA afterwards, similarly to how the UE to accesses a SA, for example by performing RRM measurement, time/frequency synchronization, PL estimation, and RACH based on the SS and other configurations in the PBCH/SIB. In some embodiments, the NSA does not send an SS, and the UE cannot discover the configurations based on searching SS. The NSA may send an RS, for example a CSI-RS, whose configurations (e.g., time/frequency resource allocation, ID, beam, transmission power) are signaled in the SIB or PDSCH of the SA, and the UE may perform RACH to the NSA based on the CSI-RS. The UE may subsequently receive configurations from the NSA.

In the block 270, the UE sends a RACH to the NSA carrier. The RACH may indicate that the UE wants to connect to an NSA carrier. In an embodiment, the RACH is not associated with (e.g., not targeted to) a particular NSA carrier.

Finally, in the block 272, the UE establishes an RRC connection to the NSA carrier. The UE receives a RACH response from the base station. The UE responds to the base station with Message 3, which includes an RRC connection request. In response, the UE receives an RRC connection setup message from the base station. The UE is now connected to the NSA carrier.

The UE then communicates with the network on the NSA carrier in the block 274. The UE and the NSA carrier exchange data and control signaling.

FIG. 16 illustrates the flowchart 280 for an embodiment method of network access. This embodiment includes no CRS, and has a reduced reliance on the PCID. Additionally, this embodiment may reduce bottlenecks by the SA carrier by reducing the number of messages transmitted over the SA carrier. Initially, the UE performs cell search. In the block 282, the UE wakes up.

After waking up, the UE receives a SS on an initial access SA carrier from a base station in the block 284. The base station may broadcast the SS on the initial access SA carrier. The SS may carry information about the PCID. The SS is used for cell search. The UE obtains the cell identity and performs coarse time/frequency synchronization based on the SS. Additionally, the UE may use the SS for coarse beam sweeping. In some embodiments, the SS is also used for cell discovery, fine time/frequency synchronization, and RRM measurement.

In the block 286, the UE receives a RS, for example a DRS, on the initial access SA carrier from the base station. The RS may be associated with the PCID, for example the RS may be generated based on a sequence obtained from the PCID. The UE measures the initial access SA carrier using the RS. The RS may be used for cell discovery and for RRM measurement. In some embodiments the RS is also used for fine time/frequency synchronization. In additional embodiments, the RS is not received. When the SS is not sufficient for the UE to decode PBCH in the next step, for example because of insufficient time/frequency synchronization or channel estimation based on the SS, the RS may be used to provide these functionalities, that the UE can decode the PBCH.

Also, in the block 288, the UE receives a PBCH from the base station on the initial access SA carrier. The PBCH may include the PCID. The PBCH contains information such as system bandwidth, system frame number, the number of transmitting antennas, etc. The PBCH and optionally additional, minimum SIB include information on the RACH opportunities and sequences for the SA and the NSAs. This may be used to determine when and how to transmit a RACH.

Then, the UE connects to a NSA, without connecting to the initial access SA carrier. In the block 290, the UE sends a RACH on the NSA carrier. In one example, the NSA carrier is on the same base station as the SA carrier. In another example, the NSA is on a different base station than the SA carrier. The RACH may indicate that the UE wants to connect to an NSA carrier. In an embodiment, the RACH is not associated with (e.g., not targeted to) a particular NSA carrier.

In response, in the block 292, the UE receives a random access response (RAR) on the NSA carrier. The RAR may include a VCID or a UEID for the UE to use in subsequent communications. Then, the UE replies with Message 3. Then the UE receives other SIBs and configurations.

Finally, in the block 294, the UE completes establishing RRC connection to the NSA carrier. The UE then communicates with the network on the NSA carrier. In some embodiments, the UE connects to a different SA carrier, without connecting to the initial SA carrier, because the UE receives information to connect to the second SA carrier from the initial SA carrier broadcast message. The UE receives a RACH response from the base station. The UE responds to the base station with an RRC connection request. In response, the UE receives an RRC connection setup message from the base station. The UE is now connected to the NSA carrier.

In the block 296, the UE communicates with the NSA carrier. The UE and the NSA carrier exchange data and control information.

FIG. 17 illustrates the flowchart 300 for an embodiment method of utilizing a SS, performed by a UE. In one embodiment, the SS is used for coarse time/frequency synchronization, cell identity, fine time/frequency synchronization, RRM management, and cell discovery. In another embodiment, the SS is used only for coarse time/frequency synchronization and cell identity. In block 302, the UE receives a SS from a base station. In one embodiment, SS is received on an SA carrier, and carries a PCID. In another embodiment, the SS is received on an NSA carrier, and carries a VCID and/or a UEID.

In the block 304, the UE obtains coarse time/frequency information from the SS received in the block 302. Then, the UE performs coarse time/frequency synchronization in the block 306. For coarse time synchronization, the UE obtains information about frame/slot/symbol timing, i.e., when a frame/slot/symbol approximately starts. The information also includes frame numbering information (e.g., system frame number), slot (or subframe) numbering within a frame, and symbol numbering within a slot (or subframe), etc. The UE also calculates where to put a fast Fourier transform (FIT) window in the time domain for FIT operation of a symbol. It is desirable for the FFT window to be placed at a time to maximize the signal-to-interference-plus noise ratio (SINR) (i.e., the exact arrival time of transmitted desired signal). However, during coarse time synchronization, the FFT window location may not be sufficiently accurate to achieve the maximum SINR, and may only be roughly within the CP. Before the UE acquires coarse or rough time synchronization, the UE is not able to place the FFT window to perform FFT (or discrete Fourier transform (DFT), etc. With the coarse or rough time synchronization, the UE is able to place the FFT window to perform FFT, DFT etc. For frequency synchronization, the UE aligns its frequency with the network by finding an estimation of the frequency offset between the network and its own local oscillator. During coarse frequency synchronization, a rough estimate of the offset is computed and compensated, so that the UE may support at least low MCS levels, such as for PDCCH demodulation and decoding with quadrature phase-shift keying (QPSK). This accuracy may not be sufficient for higher MCS levels, such as 64 quadrature amplitude modulation (QAM) or higher. The frequency offset after the coarse synchronization may be about 10% or a few percent of the subcarrier spacing. In the block 307, the UE receives a PBCH from the base station on the SA carrier. The PBCH is received using the coarse time/frequency information obtained in the block 306.

Likewise, in the block 308, the UE obtains fine time/frequency information from the SS. Then, in the block 310, the UE performs fine time/frequency synchronization based on the fine time/frequency information received in the block 308. In some embodiments, the blocks 308 and 310 are not performed. In fine time synchronization, the UE obtains information to more accurately place the FFT window for higher SINR. When fine adjustment of the FFT window position is needed, the UE makes adjustment with a fine granularity in time. In fine frequency synchronization, the UE performs further estimation of the frequency offset, leading to generally less than 1% of the subcarrier spacing.

Therefore, the UE can support higher MCS levels. For the SS to support fine time/frequency synchronization high density and wideband SS is used.

In the block 312, the UE obtains the cell identity from the SS.

Also, in the block 314, the UE performs RRM measurement in accordance with the SS. Then, in the block 316, the UE manages radio resources based on the RRM measurement generated from the SS. The UE adjusts radio network parameters to the traffic load, user positions, user mobility, quality of service requirements, and the carrier density. In the block 314, the UE determines whether it is in idle mode or in connected mode. When the UE is in connected mode, it proceeds to the block 326. In the block 326, the UE generates an RRM measurement report. Then, the UE transmits the RRM measurement report to the base station using the SA carrier. Then, the network configures suitable radio resources for the UE. When the UE is in idle mode, the UE performs cell selection and mobility support based on the RRM. The UE may perform power control algorithms. In an embodiment, the UE performs beamforming algorithms. In another embodiment, the UE performs dynamic channel allocation or dynamic frequency selection, or determines traffic adaptive handover criteria. The UE may perform adaptive filtering. In LTE, RRM measurements include reference signal received power (RSRP), reference signal received quality (RSRQ), and received signal strength indication (RSSI), based on CRS and CRS-bearing symbols (or CSI-RS in later releases). In NR, RRM measurements may not be based on CRS. For SS, RSRP measurement can be defined.

In the block 318, the UE obtains cell discovery information from the SS. Additionally, in the block 322, the UE may adjust its beamforming, especially the analog beamforming, i.e., beam direction, to compensate path loss. Also, the UE performs pathloss (PL) estimation based on the SS RRM measurement information in the block 322. In some embodiments, the blocks 318 and 322 are not performed. Then, in the block 328, the UE transmits a RACH. The power of the RACH is based on the PL estimation performed in the block 322.

FIG. 18 illustrates the flowchart 330 for an embodiment method of CSI measurement. This method may be performed before or after connecting to a carrier. Initially, in the block 332, the UE receives a CSI-RS from a base station. The CSI-RS may be received on an SA carrier, and may contain a PCID. In another embodiment, the CSI-RS is received on an SA or NSA carrier, and may contain a VCID and/or a UEID. The CSI-RS are relatively sparse in frequency but regularly transmitted by all antennas on the base station. In some examples, the CSI-RS is sparse in both time and frequency.

Then, in the block 334, the UE performs CSI based measurement on the CSI-RS received in the block 332. The UE uses the CSI-RS to estimate the channel. Then, the UE may report one or more channel state information (CSI), including, e.g., channel quality information (CQI), precoding matrix information (PMI), rank indication (RI), etc., to the base station.

FIG. 19 illustrates the flowchart 340 for an embodiment method of utilizing a DRS, performed by a UE. This method may be performed before or after connecting to a carrier. In one embodiment, the DRS is used for RRM and cell discovery. In another embodiment, the DRS is also used for fine time/frequency synchronization. In the block 342, the UE receives a DRS, in the block 342. The DRS may be received from an SA carrier, and may contain a PCID. In another example, the DRS is received from an NSA carrier, and contains a VCID and/or a UEID.

In the block 344, the UE generates an RRM measurement from the RS received in the block 342. Then, in the block 346, the UE manages radio resources based on the RRM measurement generated in the block 346. The UE adjusts radio network parameters to the traffic load, user positions, user mobility, quality of service requirements, and the carrier density. In an embodiment, the UE performs the RRM measurement and reports the RRM measurement to the network. Then, the network configures suitable radio resources for the UE. Also, the UE perform power control algorithms. In an embodiment, the UE performs beamforming algorithms. In another embodiment, the UE performs dynamic channel allocation or dynamic frequency selection, or determines traffic adaptive handover criteria. The UE may perform adaptive filtering.

In the block 352, the UE extracts fine time/frequency information form the RS. Then, in the block 354, the UE performs fine time/frequency synchronization based on the time/frequency information extracted in the block 354. In some embodiments, the blocks 352 and 354 are not performed.

In the block 356, the UE performs PL estimation based on the RS received in the block 342. The PL estimation may be used to adjust the beamforming, especially the analog beamforming, to compensate the path loss.

Figures 20, 21, 22:
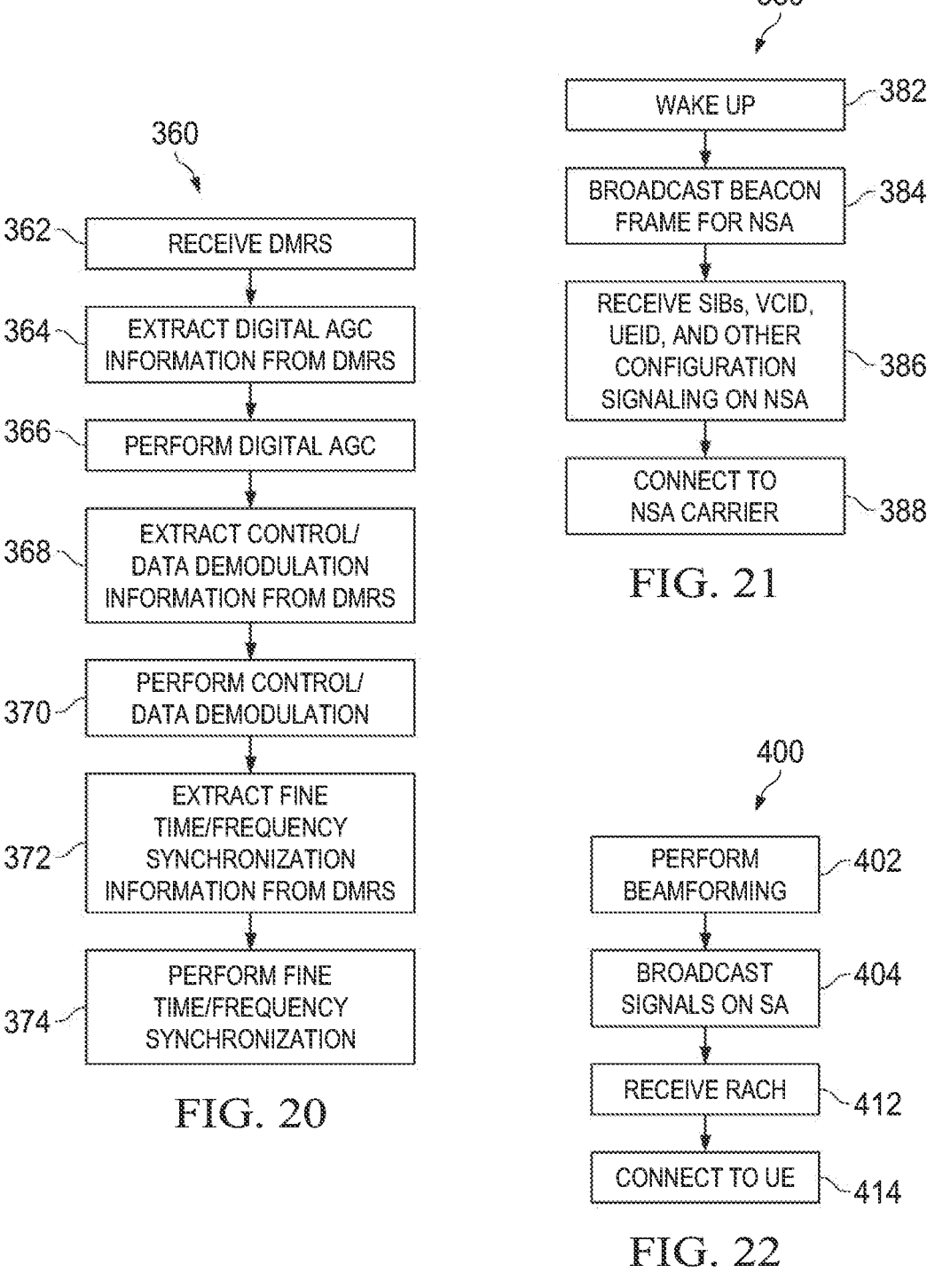
FIG. 20 illustrates a flowchart of an embodiment method for processing a demodulation reference signal (DMRS), performed by a UE.
FIG. 21 illustrates a flowchart of an embodiment method for connecting to an non-standalone (NSA) carrier, performed by a UE.
FIG. 22 illustrates a flowchart of an embodiment method for network connection, performed by a base station.

FIG. 20 illustrates the flowchart 360 for an embodiment method of processing one or more DMRS and/or a preamble performed by a UE. In one embodiment, the DMRS is used for digital AGC and control and data demodulation. In another embodiment, the DMRS is also used for fine time/frequency synchronization. In the block 362, the UE receives a DMRS from a base station. The DMRS may be received before or after connecting to a carrier. The DMRS may be received on a SA carrier and contain a PCID. In an additional example, the DMRS is received on an SA/NSA carrier, and is generated from a VCID or a UEID.

In the block 364, the UE extracts information for digital AGC from the DMRS. Then, in the block 366, the UE performs digital AGC. Digital AGC may be used to improve the uniformity in the received power.

In the block 368, the UE extracts control channel demodulation information and/or data channel demodulation information from the DMRS, including performing channel estimation based on the DMRS. Then, in the block 370, the UE performs control channel demodulation based on the control channel demodulation information. Also, the UE performs data channel demodulation base on the data channel demodulation information. The control channel is generally processed before the data channel. The DMRS for the control channel may be different from the DMRS for the data channel. Also, for different control channels, there may be different DMRSs, and for different data channels there may be different DMRSs.

Also, in the block 372, the UE extracts fine time/frequency synchronization from the DRMS. Then, in the block 374, the UE performs fine time/frequency synchronization based on the time/frequency synchronization information extracted from the DMRS. In some embodiments, blocks 372 and 374 are not performed. In some embodiments, blocks 372 and 374 are performed before or concurrently with block 368.

FIG. 21 illustrates the flowchart 380 for an embodiment method of connecting to an NSA, performed by a UE, where the UE initiates the carrier connection with information obtained from an SA. Initially, in the block 382, the UE wakes up.

Then, in the block 384, the UE broadcasts a beacon signal or transmits a RACH. The beacon frame indicates that the UE is seeking to connect to an NSA. The beacon frame may contain a UEID. The timing and method for sending the beacon signal may be based on information obtained from the broadcast information, for example in SIB, from an SA, and the coarse time/frequency synchronization of the UE is achieved with the SS of the SA. When UE performs RACH UL beacon transmission, the UE does not need to attempt connect to a particular TRP/carrier or NSA. The UE might not have any particular target.

In response, in the block 386, the UE receives signals from a base station on an NSA. The signals may include SIBs, a VCID, a UEID or other configurations.

The UE connects to the NSA carrier in the block 388 based on the RRC signaling received in the block 386. The UE may receive RRC signaling to connect to the NSA. In an embodiment, the UE does not receive the NSA configurations when the connection starts, but just receives a PDCCH or ePDCCH generated with the UEID assigned that UE, so the UE knows that the PDCCH or ePDCCH is intended for itself. Then, the UE decodes the control, and further decodes the data associated with the PDCCH or ePDCCH. Therefore, data communication may be performed without pre-configuration of TRPs/carriers. The data sent by these TRPs/carriers is not pre-configured to the UE, and may be self-contained. Some configuration information may be embedded in the control.

FIG. 22 illustrates the flowchart 400 for an embodiment method of connecting to a UE performed by a base station. The base station may implement an SA carrier. In one embodiment, the base station implements one or more SA carriers and one or more NSA carriers. In the block 402, the base station performs analog beamforming on one or more signals. In one embodiment, the base station performs the same analog beamforming for multiple signals. For example, the base station performs the same analog beamforming for an SS, an RS, a PBCH, and SIBs. In another embodiment, the base station performs similar analog beamforming on the multiple signals. The signals may be quasi co-located (QCL) with respect to delay spreading, Doppler spreading, Doppler shift, average gain, and average delay. In an embodiment, the signals with the same analog beamforming are signaled to be QCL with respect to beam direction uniformity, so that the UE knows which beam(s) to use to receive other signals.

Then, in the block 404, the base station broadcasts signals on an SA based on the analog beamforming performed in the block 402. These signals may be broadcast to UEs which are not connected to a carrier. In one embodiment, the base station broadcasts an SS, a RS, for example a DRS, and a PBCH. In another embodiment, the base station also broadcasts carrier SIBs. The broadcast signals include a PCID.

In response, in the block 412, the base station receives a RACH from a UE. The RACH may be received on the SA used in the block 404 or on an NSA.

Then, in the block 414, the base station connects the UE to the carrier. In one embodiment, the base station connects to the UE using RRC signaling. The base station may receive an RRC connection request from the UE. In response, the base station transmits an RRC connection setup message to the UE. The base station is now connected to the UE on the NSA carrier.

Figure 23:
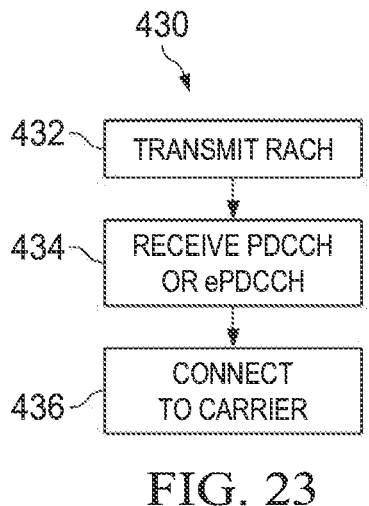
FIG. 23 illustrates a flowchart for an embodiment method for connecting to a carrier, performed by a UE.

FIG. 23 illustrates the flowchart 430 for an embodiment method of connecting to a carrier by a UE. In one example, the UE is already connected to a carrier. In another example, the UE is not yet connected to a carrier. In the block 432, the UE transmits a RACH preamble to a base station.

In response, in the block 434, during the RAR reception, the UE receives a PDCCH or an ePDCCH from a base station. The PDCCH or the ePDCCH is scrambled with the UEID assigned to the UE. The PDCCH or ePDCCH points to PDSCH with the RACH response, which includes information regarding the timing and manner for transmitting Message 3.

Finally, in the block 436, the UE is connected to the carrier. The UE transmits Message 3 and receives RRC configuration information. The carrier may be an SA carrier or an NSA carrier. The UE communicates data and control signaling with the carrier.

Figure 24:
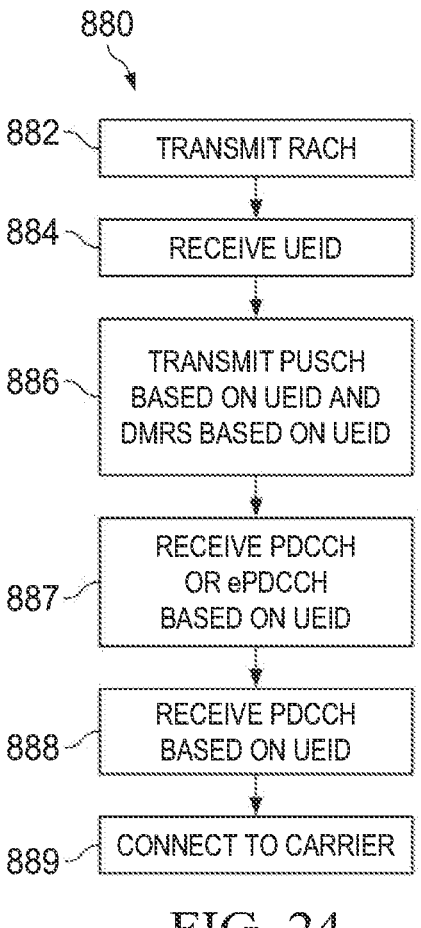
FIG. 24 illustrates the flowchart 880 for an embodiment method of connecting to a carrier.

FIG. 24 illustrates the flowchart 880 for an embodiment method of connecting to a carrier. In the block 882, the UE transmits a RACH. Configuration for the RACH has been obtained from a SA carrier. In the block 884, the UE receives a UEID on an NSA carrier. The UEID is specifically for the receiving UE. In the block 886, the UE transmits a PUSCH and a DMRS, based on the UEID, on the NSA carrier. For example, the DMRS is scrambled with the UEID. In response, in the block 887, the UE receives a PDCCH or an ePDCCH, based on the UEID, on the NSA carrier. Also, in the block 888, the UE receives a PDSCH, based on the UEID, on the second carrier. For example, the PDDCH or ePDCCH and the PDSCH are scrambled with the UEID. Finally, in the block 889, the UE is connected to the NSA carrier.

Figure 25:
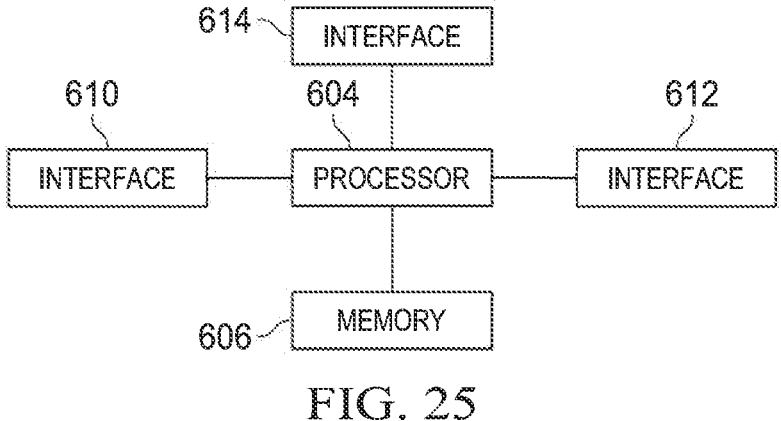
FIG. 25 illustrates a block diagram of an embodiment processing system.

FIG. 25 illustrates a block diagram of an embodiment processing system 600 for performing methods described herein, which may be installed in a host device. As shown, the processing system 600 includes a processor 604, a memory 606, and interfaces 610-614, which may (or may not) be arranged as shown in FIG. 25. The processor 604 may be any component or collection of components adapted to perform computations and/or other processing related tasks, and the memory 606 may be any component or collection of components adapted to store programming and/or instructions for execution by the processor 604. In an embodiment, the memory 606 includes a non-transitory computer readable medium. The computer-readable non-transitory media includes all types of computer readable media, including magnetic storage media, optical storage media, and solid state storage media and specifically excludes signals. It should be understood that the software can be installed in and sold with the device. Alternatively the software can be obtained and loaded into the device, including obtaining the software via a disc medium or from any manner of network or distribution system, including, for example, from a server owned by the software creator or from a server not owned but used by the software creator. The software can be stored on a server for distribution over the Internet, for example.

The interfaces 610, 612, 614 may be any component or collection of components that allow the processing system 600 to communicate with other devices/components and/or a user. For example, one or more of the interfaces 610, 612, 614 may be adapted to communicate data, control, or management messages from the processor 604 to applications installed on the host device and/or a remote device. As another example, one or more of the interfaces 610, 612, 614 may be adapted to allow a user or user device (e.g., personal computer (PC), etc.) to interact/communicate with the processing system 600. The processing system 600 may include additional components not depicted in FIG. 25, such as long term storage (e.g., non-volatile memory, etc.).

In some embodiments, the processing system 600 is included in a network device that is accessing, or part otherwise of, a telecommunications network. In one example, the processing system 600 is in a network-side device in a wireless or wireline telecommunications network, such as a base station, a relay station, a scheduler, a controller, a gateway, a router, an applications server, or any other device in the telecommunications network. In other embodiments, the processing system 600 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 26:
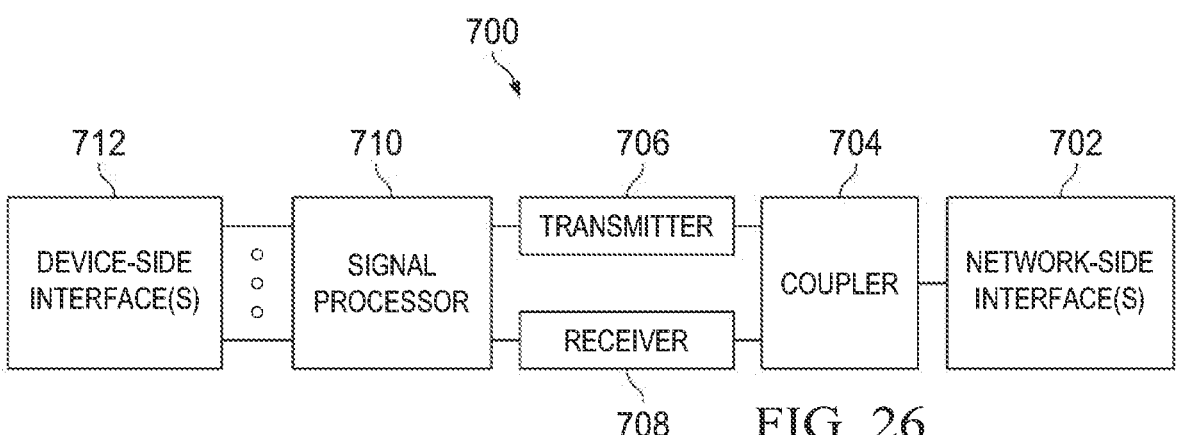
FIG. 26 illustrates a block diagram of an embodiment transceiver.

In some embodiments, one or more of the interfaces 610, 612, 614 connects the processing system 600 to a transceiver adapted to transmit and receive signaling over the telecommunications network. FIG. 26 illustrates a block diagram of a transceiver 700 adapted to transmit and receive signaling over a telecommunications network. The transceiver 700 may be installed in a host device. As shown, the transceiver 700 comprises a network-side interface 702, a coupler 704, a transmitter 706, a receiver 708, a signal processor 710, and a device-side interface 712. The network-side interface 702 may include any component or collection of components adapted to transmit or receive signaling over a wireless or wireline telecommunications network. The coupler 704 may include any component or collection of components adapted to facilitate bi-directional communication over the network-side interface 702. The transmitter 706 may include any component or collection of components (e.g., up-converter, power amplifier, etc.) adapted to convert a baseband signal into a modulated carrier signal suitable for transmission over the network-side interface 702. The receiver 708 may include any component or collection of components (e.g., down-converter, low noise amplifier, etc.) adapted to convert a carrier signal received over the network-side interface 702 into a baseband signal. The signal processor 710 may include any component or collection of components adapted to convert a baseband signal into a data signal suitable for communication over the device-side interface(s) 712, or vice-versa. The device-side interface(s) 712 may include any component or collection of components adapted to communicate data-signals between the signal processor 710 and components within the host device (e.g., the processing system 600, local area network (LAN) ports, etc.).

The transceiver 700 may transmit and receive signaling over any type of communications medium. In some embodiments, the transceiver 700 transmits and receives signaling over a wireless medium. For example, the transceiver 700 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 702 comprises one or more antenna/radiating elements. For example, the network-side interface 702 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 700 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

The disclosure has been described in conjunction with various embodiments. However, other variations and modifications to the disclosed embodiments can be understood and effected from a study of the drawings, the disclosure, and the appended claims, and such variations and modifications are to be interpreted as being encompassed by the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate, preclude or suggest that a combination of these measures cannot be used to advantage. A computer program may be stored or distributed on a suitable medium, such as an optical storage medium or a solid-state medium supplied together with, or as part of, other hardware, but may also be distributed in other forms, such as via the Internet or other wired or wireless telecommunication systems.

What is claimed is:

1. A method, comprising:

receiving, by a user equipment (UE) in an IDLE mode from a first network entity on a first carrier, a synchronization signal (SS) and a physical broadcast channel (PBCH);

receiving, by the UE in the IDLE mode from the first network entity, a system information block (SIB) on the first carrier, the SIB including first configuration information related to a random access preamble;

transmitting, by the UE in the IDLE mode to a second network entity different from the first network entity, the random access preamble on a second carrier in accordance with the first configuration information in the SIB; and establishing, by the UE on the second carrier, a radio resource control (RRC) connection with the second network entity, wherein the UE is in the IDLE mode prior to initiating establishment of the RRC connection with the second network entity.

2. The method of claim 1, wherein the second carrier is different from the first carrier.

3. The method of claim 1, wherein the first network entity is a first cell, and the second network entity is a second cell.

4. The method of claim 1, the establishing the RRC connection with the second network entity comprising:

establishing the RRC connection with the second network entity without establishing a first RRC connection with the first network entity before the RRC connection with the second network entity is established.

5. The method of claim 1, wherein the UE receives the SS, the PBCH, and the SIB from the first network entity without establishing a first RRC connection with the first network entity.

6. A method, comprising:

transmitting, by a first network entity to a user equipment (UE) in an IDLE mode on a first carrier, a synchronization signal (SS) and a physical broadcast channel (PBCH);

transmitting, by the first network entity to the UE in the IDLE mode, a system information block (SIB) on the first carrier, the SIB including first configuration information related to a random access preamble;

receiving from the UE in the IDLE mode, by a second network entity different from the first network entity, the random access preamble on a second carrier in accordance with the first configuration information in the SIB; and establishing, by the second network entity on the second carrier, a radio resource control (RRC) connection with the UE, wherein the UE is in the IDLE mode prior to initiating establishment of the RRC connection with the second network entity.

7. The method of claim 6, wherein the second carrier is different from the first carrier.

8. The method of claim 6, the establishing the RRC connection with the UE comprising:

establishing the RRC connection with the UE without the UE establishing a first RRC connection with the first network entity before the RRC connection with the UE is established.

9. The method of claim 6, wherein the UE receives the SS, the PBCH, and the SIB from the first network entity without establishing a first RRC connection with the first network entity.

10. A user equipment (UE), comprising:

at least one processor; and a non-transitory computer readable storage medium storing programming, the programming including instructions that, when executed by the at least one processor, cause the UE to perform operations including:

receiving, by the UE in an IDLE mode from a first network entity on a first carrier, a synchronization signal (SS) and a physical broadcast channel (PBCH);

receiving, by the UE in the IDLE mode from the first network entity, a system information block (SIB) on the first carrier, the SIB including first configuration information related to a random access preamble;

transmitting, by the UE in the IDLE mode to a second network entity, the random access preamble on a second carrier in accordance with the first configuration information in the SIB; and establishing a radio resource control (RRC) connection with the second network entity on the second carrier, wherein the UE is in the IDLE mode prior to initiating establishment of the RRC connection with the second network entity.

11. The UE of claim 10, wherein the second carrier is different from the first carrier.

12. The UE of claim 10, the establishing the RRC connection with the second network entity comprising:

establishing the RRC connection with the second network entity without establishing a first RRC connection with the first network entity before the RRC connection with the second network entity is established.

13. The UE of claim 10, wherein the UE receives the SS, the PBCH, and the SIB from the first network entity without establishing a first RRC connection with the first network entity.

14. A system, comprising:

a first network entity; and a second network entity different from the first network entity, the first network entity being configured to:

transmit, to a user equipment (UE) in an IDLE mode on a first carrier, a synchronization signal (SS) and a physical broadcast channel (PBCH); and transmit, to the UE in the IDLE mode, a system information block (SIB) on the first carrier, the SIB including first configuration information related to a random access preamble;

the second network entity being configured to:

receive, from the UE in the IDLE mode, the random access preamble on a second carrier in accordance with the first configuration information in the SIB; and establish a radio resource control (RRC) connection with the UE on the second carrier, wherein the UE is in the IDLE mode prior to initiating establishment of the RRC connection with the second network entity.

15. The system of claim 14, wherein the second carrier is different from the first carrier.

16. The system of claim 14, wherein the second network entity establishes the RRC connection with the UE without the UE establishing a first RRC connection with the first network entity before the RRC connection with the UE is established.

17. The system of claim 14, wherein the UE receives the SS, the PBCH, and the SIB from the first network entity without establishing a first RRC connection with the first network entity.

* * * * *